United States Patent [19]
Rose et al.

[11] Patent Number: 5,526,001
[45] Date of Patent: Jun. 11, 1996

[54] PRECISE BEARINGS ONLY GEOLOCATION IN SYSTEMS WITH LARGE MEASUREMENTS BIAS ERRORS

[75] Inventors: Conrad M. Rose, Dahlgren, Va.; Kurt M. Dangle, Columbia, Md.

[73] Assignee: Litton Systems Inc., Woodland Hills, Calif.

[21] Appl. No.: 383,669

[22] Filed: Feb. 1, 1995

Related U.S. Application Data

[63] Continuation of Ser. No. 992,968, Dec. 11, 1992, abandoned.

[51] Int. Cl.$^6$ .................................. G01S 5/04; G01S 3/02
[52] U.S. Cl. ............................................. 342/442; 342/450
[58] Field of Search ........................... 342/417, 420, 342/449, 428, 424, 450

[56] References Cited

U.S. PATENT DOCUMENTS

| | | | |
|---|---|---|---|
| 3,691,560 | 9/1972 | Hammack | 342/450 |
| 3,866,229 | 2/1975 | Hammack | 342/451 |
| 3,922,533 | 11/1975 | Royal | 342/442 |

*Primary Examiner*—Gregory C. Issing
*Attorney, Agent, or Firm*—Gerald L. Lett

[57] ABSTRACT

Bearing rate of change, or equivalently bearing differences, are used to estimate emitter geolocation, in contrast to using such rates or differences to estimate only range. In using the bearing differences, it is not necessary to maintain the same relative bearing to compensate for DOA dependent errors. Nor does the invention require a precise fully resolved and calibrated interferometer to generate DF measurements. Furthermore, it can be used with currently implemented amplitude DF systems that employ no phase interferometry at all. By making minimal changes, these systems will produce accurate geolocation. The invention will also work with any system that can be modified to produce an accurate bearing rate-of-change. Therefore, it can be used with time-difference-of-arrival (TDOA) systems also. If bearing measurements are also produced by such systems, the magnitude of the bias on that bearing measurement is not important. The effect of angle bias errors in performing bearings-only geolocation are greatly reduced or eliminated. Bias and random components of the measurement error are separated, an estimation of bias error in azimuth or AOA measurements can also be generated. Bearings differences are uniquely associated with curves, e.g. circles, on which the emitter must lie. A plurality of circles are generated to unamibiguously determine emitter geolocation. Multiple platforms may be used to generate the bearing differences. It is also possible to utilize existing bearings-only emitter location software by generating psuedo bearings. The new pseudo bearing measurements use bearing differences, rather than AOA. Geolocation is thus derived strictly from bearing differences, thus eliminating the effects of bias error.

5 Claims, 34 Drawing Sheets

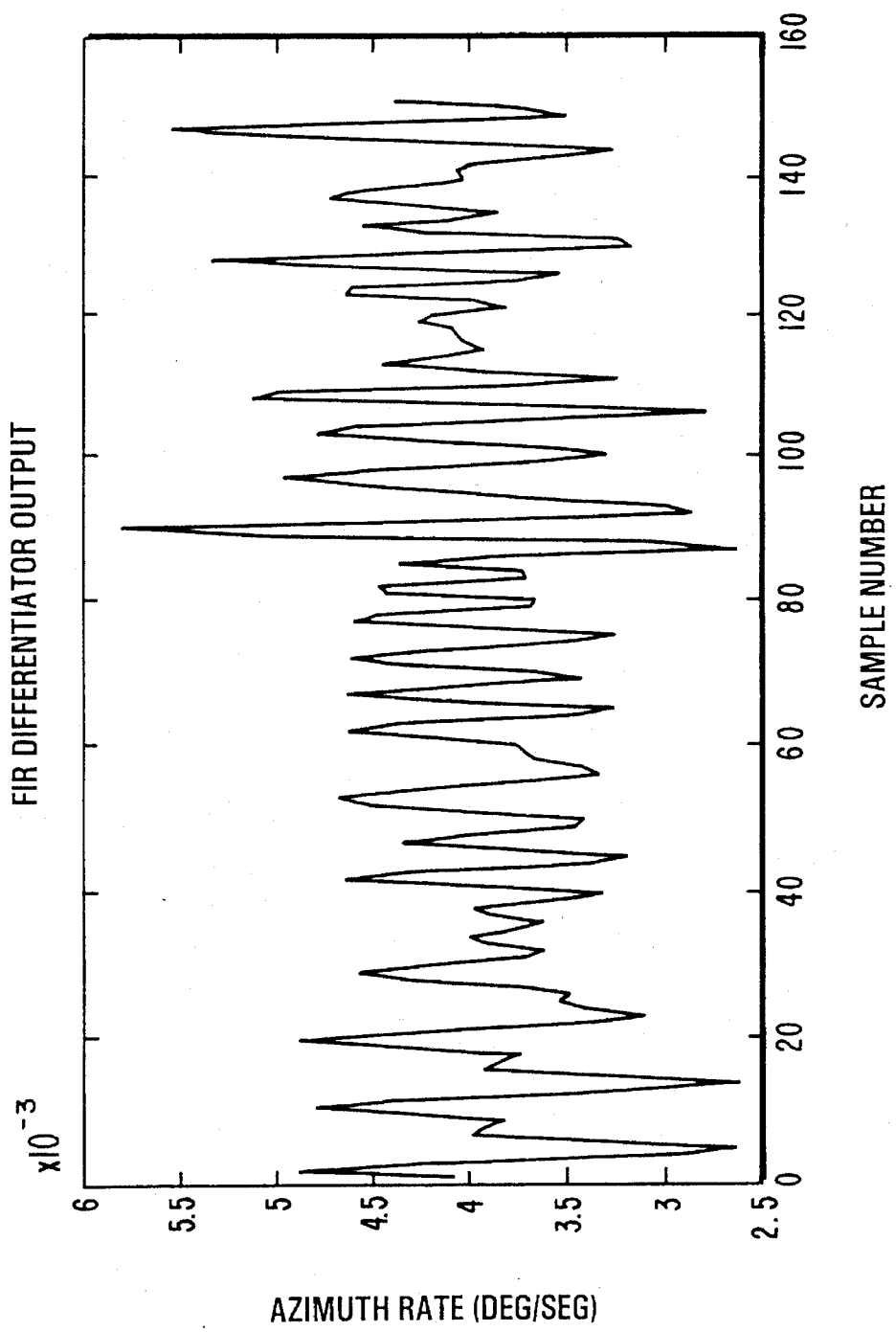

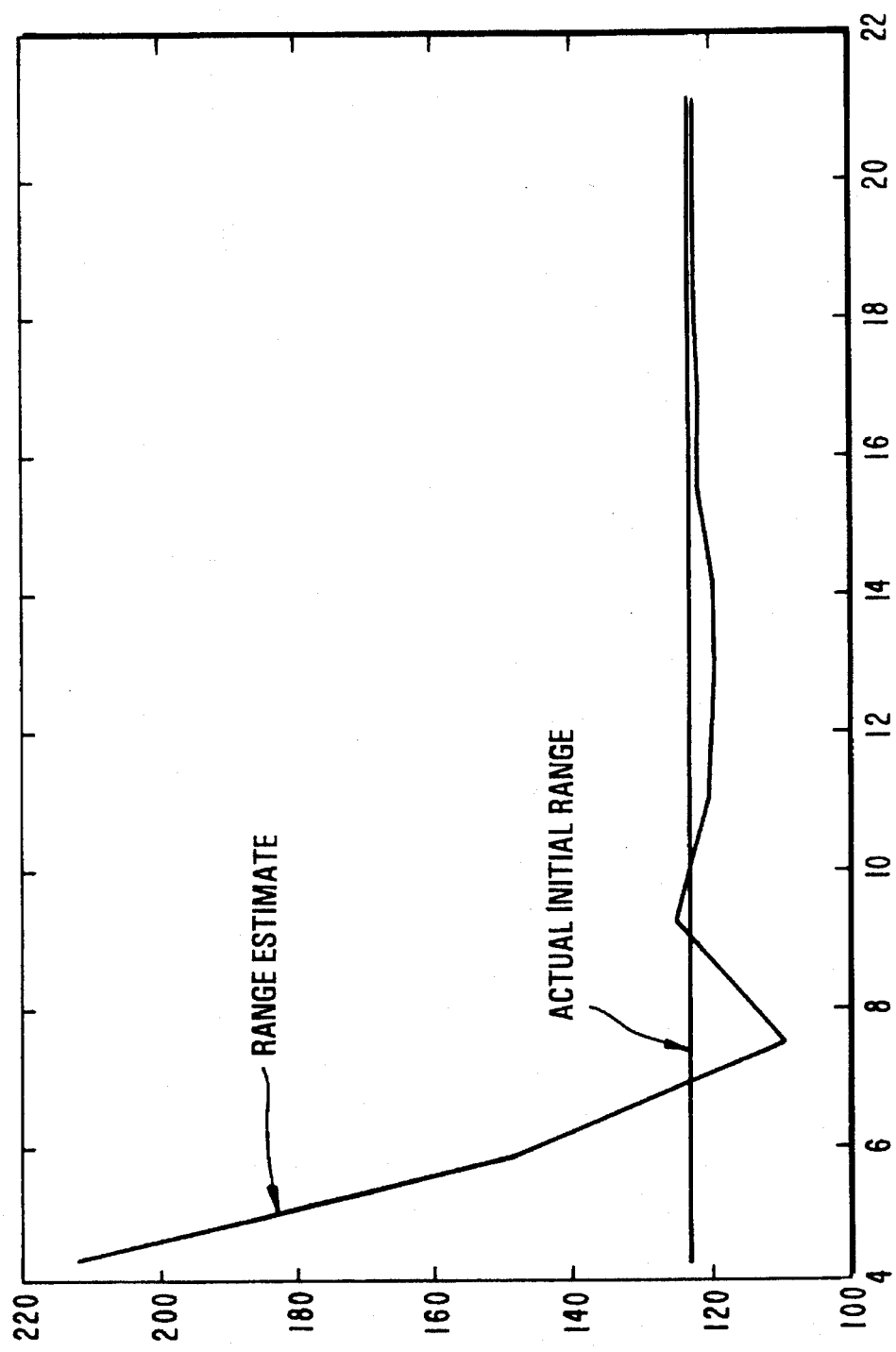

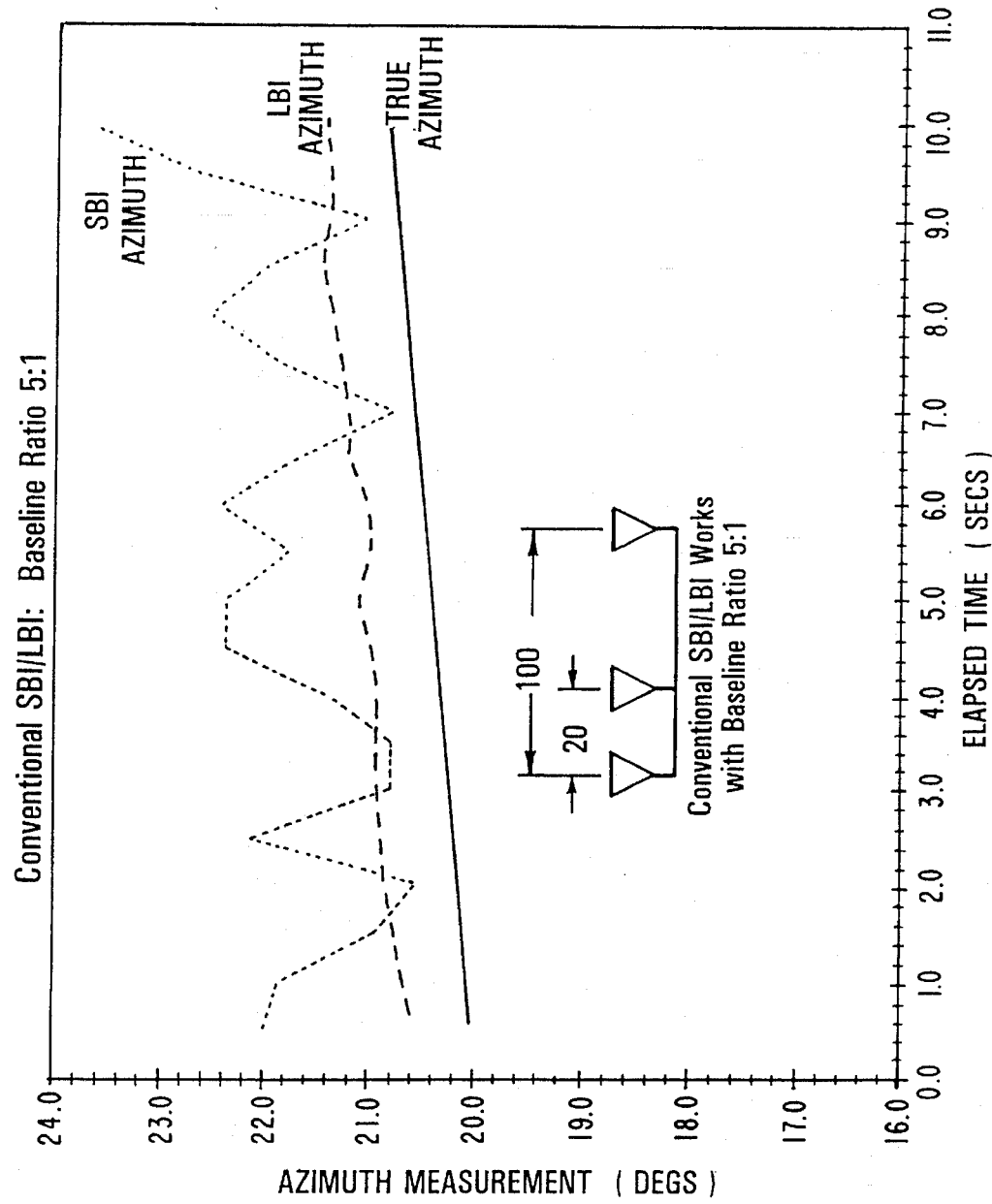

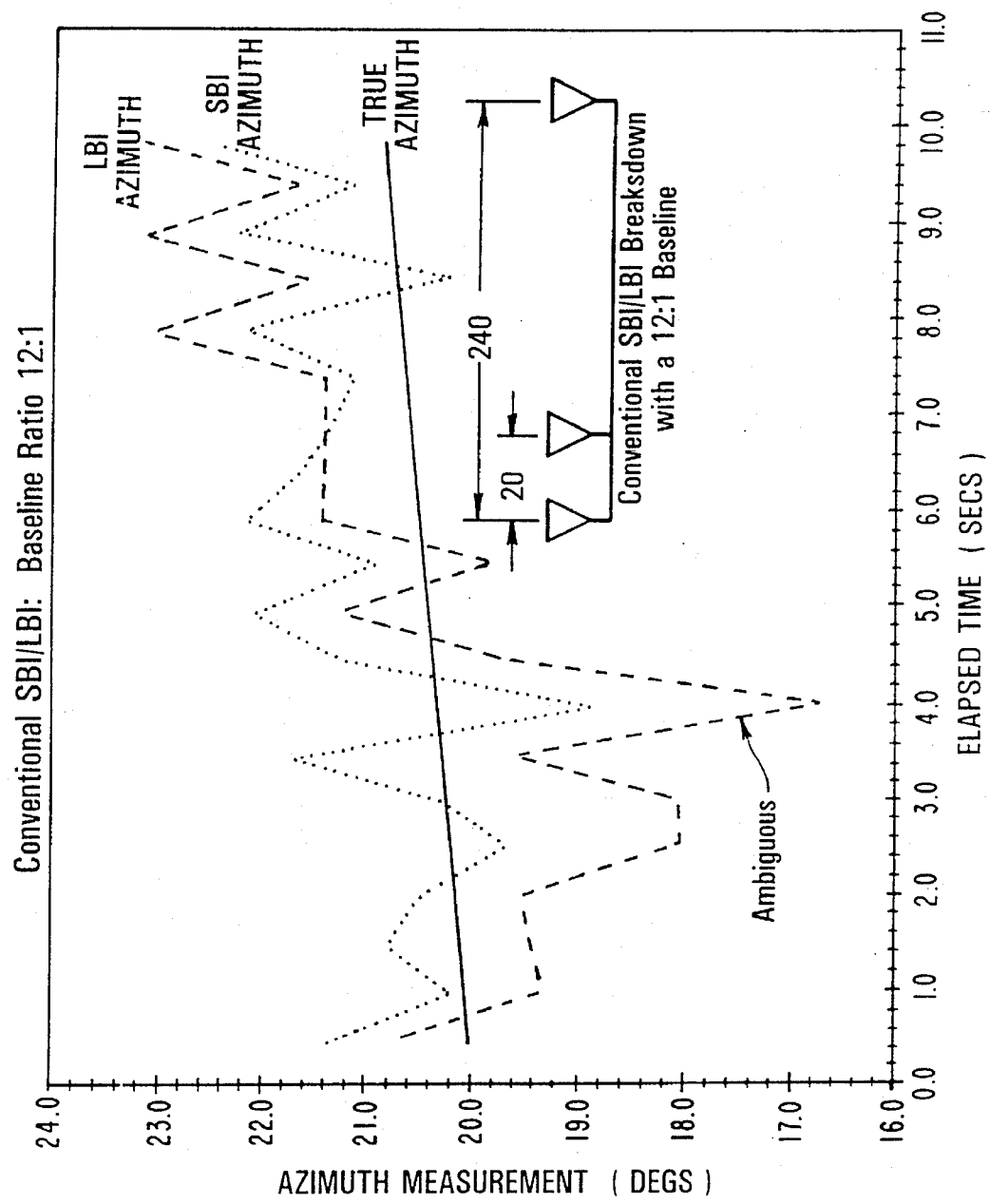

SCENARIO

EMITTER RANGE ASSUMED IN AOA/LBI - 16 nmi

TRUE INITIAL RANGE = 32 nmi

INIT BRG

A/C PARAMS
- Straight and Level Flight
- 480 kts @ 5,000 Alt.

COLLECTION PARAMS
- 13 dB SNR
- Monopulse
- 2Ghz
- 0.5 sec Update Int
- SBI/LBI Bias: 17°/200°

ARRAY CONFIGURATION

A/C CENTERLINE

SBI/LBI: 19.2° / 240° (= 12:1 RATIO)

SBI

45

LBI

PRECISE BEARINGS ONLY GEOLOCATION IN SYSTEMS WITH LARGE MEASUREMENTS BIAS ERRORS

This application is a continuation of application Ser. No. 07/992,968, filed Dec. 11, 1992 now abandoned.

BACKGROUND OF THE INVENTION

1. Field of Invention

This invention concerns the accurate geolocation of emitters, as opposed to estimation of emitter range alone, using sensor-emitter angle-of-arrival (AOA) or azimuth rate measurements from single or multiple platforms. As used herein, geolocation refers to x,y coordinate position in a local level frame, where the local level frame is a plane tangent to the surface of the earth directly below the sensor position.

2. Related Art

Emitter azimuth or bearing measurements are typically made separated at points in space and time; hence this technique involves a discrete time state estimation problem. The sensor used to measure the angle rate may involve detection of RF (radio frequency) energy, such as a phase interferometer, an IR (infra red) tracker, or it may involve detecting acoustic energy, such as a sonar array. Spatially distributed sensors on multiple moving platforms may be used, or just a sensor on a single platform.

Measuring emitter azimuth is a statistical process that typically results in systematic and random errors corrupting the true azimuth value. Systematic errors are constant biases, or other errors exhibiting a long correlation time compared with the time over which the estimation is performed. Estimation techniques, such as those based on the Kalman filter, can very successfully convert azimuth measurements to range estimates when only random errors are present. However, systematic errors tend to degrade performance of the Kalman filter, as described for example in R. J. Brown and A. P. Sage, "Analysis of Modeling and Bias Errors in Discrete-Time State Estimation", IEEE Trans. Aerospace and Electronic Systems, vol AES 7, No. 2 March 1971. Also, M. Garvish and E. Fogel, "Effect of Bias on Bearings-Only Target Location", (IEEE Trans. on Aerospace and Electronics Systems, vol. 26, No. 1 January 1990) present an error bound, the Cramer Rao bound, describing the effect of biased bearing measurements on estimates of emitter location independent of the specific estimator realization used. The results are presented pictorially for a single platform in FIG. 1.

A bias error in bearing-only emitter location causes the estimate to lie on circle 16 through the actual emitter and sensor positions. As seen by that Figure, the magnitude of the bias effect is a function of emitter relative bearing from the observing platform 10. Even a small bias can significantly degrade range accuracy for small relative bearing from platform 10 to actual emitter location 12. Because range accuracy is degraded, emitter geolocation is rendered less accurate. At larger relative bearings, e.g., from platform 10 to actual emitter location 14, range accuracy is not degraded significantly by large bearing measurement biases. However, geolocation accuracy, as given by the Cramer Rao bound, will still suffer when the bearing systematic error is not negligible. Furthermore, aside from the degradation indicated by the Cramer Rao bound, the actual location algorithm used may fail catastrophically due to the unexpected bias.

A standard method of passively locating an emitter from a moving sensor is based on bearing or azimuth measurements made at different points along the sensor trajectory. This technique is referred to as the bearing method, or equivalently the bearing only method, and has been the topic of much research in the past. The effect of random errors on passive location system performance has been well understood for some time, e.g. as detailed in D. J. Torrieri, "Statistical Theory of Passive Location Systems", IEEE Transactions on Aerospace and Electronic Systems, T-AES vol.20, (March 1984), 183–198. However, actual implementations may have large systematic errors on the bearing measurements as well as random errors.

Systematic or bias errors typically arise when a trade-off is made in the system providing the bearing measurement used by the geolocation algorithm, such as a direction-finding (DF) system, involving system cost, weight and complexity. For instance, in RF sensor based systems, bias errors can be controlled by repeated real-time system calibration that compensates for thermal and frequency dependent errors. Calibration during installation can also compensate for direction-of-arrival or DOA dependent bias errors caused by sensor antennas and radomes. However, such compensation methods lead to complexities in system design, and can necessitate expensive testing during manufacture. Furthermore, calibration as a means to reduce bias error will not work for existing systems designed without incorporating that approach ab initio.

A further example of the cost, weight and complexity versus system bias trade-off that is made in the design and implementation of practical systems is the use of RF amplitude direction finding sensors as opposed to phase interferometer arrays. Wideband phase interferometers in practical RF systems have systematic errors associated with them on the order of tenths of a degree, but may require four or more antennas per DF measurement, as well as elaborate receiver designs to measure emitter signal wavefront phase between different antenna pairs. Amplitude DF systems may use as few as one antenna per DF measurement, and require less complex associated receivers, but can have systematic errors on the order of tens of degrees.

The largest component of the bias in the bearing measurement for such phase and amplitude DF systems is typically a function of the emitter angular location relative to the antenna boresites. Therefore, previous attempts at controlling the effect of bias have concentrated on maintaining the same relative boresite angle with respect to the antenna or antenna array.

Poirot and Arbid, "Position Location: Triangulation versus Circulation", IEEE T-AES, vol 14, no. 1, 1978, Mahapatra, "Emitter Location Independent of Errors in Direction Finders", IEEE T-AES, vol. 16, No. 6, 1980, and M. Mangel "Three Bearing Method for Passive Triangulation in Systems with Unknown Deterministic Biases", IEEE T-AES vol 17 (November 1981) 814–819, all describe techniques for handling such DOA dependent bias or systematic errors, as opposed to random errors. The approach in each case is essentially to fix the systematic error by maintaining the same relative bearing to the target. One disadvantage to these approaches is that the systematic error must be DOA dependent, and hence bias errors arising from internal system sources, such as errors in phase delay lines, will not be accounted for. Another drawback to these approaches is that a very precise observer track must be flown. Flying a precise track is operationally very restrictive for the sensor platform. Furthermore, these techniques do not allow the use of multiple observing platforms, each with its own systematic error.

There are techniques that do single platform ranging as opposed to geolocation using bearing rate of change, and so are insensitive to moderate azimuth bias. A. L. Haywood, "Passive Ranging by Phase-Rate Techniques" (Wright-Patterson AFB Tech. Report ASD-TR-70-46, December 1970), provides a theoretical analysis of this approach, and Kaplan, U.S. Pat. No. 4,734,702 provides one practical implementation. However, bearing-rate techniques estimate range, but cannot refine biased azimuth measurements to produce accurate emitter geolocation. Conventional geolocation systems utilizing bearing as an input, will not remove systematic errors in the bearing measurement either.

If the bias on the bearing or azimuth measurement is too large in such a conventional system, it is unable to produce an accurate geolocation estimate because the estimator diverges for reasons given in Brown and Sage, previously mentioned. FIGS. 2a–2d illustrate this behavior. The scenario used is an aircraft, such as an F-16, flying 10,000 ft at 480 kts, with the emitter at a frequency of 18 GHz, relative bearing of 45°, and distance initially of 123 nm. An interferometer with a baseline of 20" having negligible phase bias error is used to make the bearing measurements.

FIG. 2a shows the true and measured bearing with the measured bearing being input to the geolocation filter. The bearing measurement has only a very small systematic error. The estimator used is that described in T. L. Song and J. L. Speyer, "A Stochastic Analysis of a Modified Gain Extended Kalman Filter with Applications to Estimation with Bearings Only Measurements", IEEE Trans. on Automatic Control, vol. AC-30, October 1985. This estimator will be referred to as the MGEKF. Note that any other state-of-the-art bearings-only estimator would exhibit similar performance. FIG. 2b shows the accurate resulting MGEKF range estimate driven by the bearings shown in FIG. 2a.

FIG. 2c is the true and measured emitter bearings for the same scenario, but with a measurement phase bias error present. This phase bias error arises from receiver and delay line calibration errors. These introduce significant systematic error into the bearing measurement. FIG. 2d shows the degradation of the performance of the same MGEKF range estimate used in FIG. 2b, but now driven by the biased bearing measurements shown in FIG. 2c. The performance degration results from the presence of this systematic error.

Although the bearing-rate techniques do not suffer from this sensitivity to systematic error, which is largely eliminated in the process of differencing the measurement, they have another drawback, aside from producing range-only and inaccurate geolocation. This other drawback, which is significant, is that bearing-rate techniques cannot be used to perform emitter location utilizing sensors on multiple platforms since range is generated relative to the single sensor bearing rate of change.

Amplitude DF systems are widely used on many military aircraft to warn of illumination by radars on hostile missile-launch platforms. This application is referred to as radar warning or RW. RW systems generally use emitter signal amplitude/phase measurements and the known characteristics of frequency-independent antennas to generate DF.

There are several ways this is commonly done, e.g. two-channel amplitude and phase comparison, three channel amplitude and phase comparison, and single channel amplitude comparison. Two and three channel amplitude comparison have their DF measurement accuracies degraded principally by the following systematic errors: emitter signal polarization errors, antenna pattern and mechanical alignment inaccuracies, RF beam forming errors, and calibrated receiver imbalance errors. Thermal noise is the main source of random error. Single channel amplitude comparison systems do not have the RF beam-forming network errors, but experience larger polarization and antenna pattern errors, as well as larger thermal and receiver calibration errors.

Another DF measurement approach, phase comparison, or phase interferometry, also does not suffer beam-forming errors, and experiences smaller degradation from the other errors. Thus its DF measurement accuracy can typically be ten times better than single channel amplitude comparison, eight times better than two-channel amplitude and phase comparison, and four times better than three channel amplitude and phase comparison systems. Fully resolved phase comparison systems are typically needed for accurate geolocation, but such systems tend to be costly and complex. The complexity arises both from the small system phase measurement error needed, and accurate spatial resolution desired. Spatial resolution requires a long interferometer baseline, which in turn requires multiple antenna pairs to resolve the resulting phase or AOA ambiguities, as disclosed in U.S. Pat. No. 4,638,320 by Eggert et al. These antenna pairs then require receiver channels, which require calibration.

Phase comparison systems are not just complex and costly, but also suffer from operational difficulties. Amplitude comparison systems are well adapted to monopulse operation. But phase comparison systems, because of the multiple antenna pairs involved, typically require receiver channel switching, and so may not be fully resolved before the emitter signal disappears. The signal may disappear because of emitter scanning, terrain blockage, or sensor platform attitude changes. This is why amplitude comparison systems are typically used for threat or radar warning (RW), as opposed to phase comparison systems.

Unfortunately, DF measurements made with amplitude systems can be as inaccurate as 20°, and so are useless for doing precise emitter geolocation.

SUMMARY OF THE INVENTION

This invention utilizes bearing rate of change, or equivalently bearing differences, to estimate emitter geolocation, in contrast to using such rates or differences to estimate only range. In using the bearing differences, the invention does not rely on maintaining the same relative bearing to compensate for DOA dependent errors. Nor does the invention require a precise fully resolved and calibrated interferometer to generate DF measurements. Furthermore, it can be used with currently implemented amplitude DF systems that employ no phase interferometry at all. By making minimal changes, these systems will produce accurate geolocation. The invention will also work with any system that can be modified to produce an accurate bearing rate-of-change. Therefore, it can be used with time-difference-of-arrival (TDOA) systems also. If bearing measurements are also produced by such systems, the magnitude of the bias on that bearing measurement is not important.

It is one object of this invention to eliminate the sensitivity of currently implemented bearings-only estimators such as the MGEKF to the bias error in such corrupted measurements.

The invention provides an emitter geolocation method which includes detecting an emitter with an emitter detection means. First and second platform positions are identified with a platform position determining means. A first bearing difference is determined between the emitter and the first and second platform positions with a bearing difference determining means. A processing means projects a first locus intersecting the first and second platform positions and the actual emitter position consistent with the first bearing difference. A third platform position is determined with the platform position determining means. A second bearing difference is determined between said emitter and said second and third platform positions with the bearing difference determining means. The processing means projects a second locus intersecting the second and third platform positions and the actual emitter position consistent with the second bearing difference. A signal is generated indicating the actual emitter position at a position corresponding to the intersection of the first and second loci at a point other than the second platform position.

The invention reduces the effect of bias error in discrete-time state estimation. Specifically, it greatly reduces or eliminates the effect of angle bias errors in performing bearings-only geolocation. It can separate the bias and random components of the measurement error, hence can also generate an estimation of bias error in azimuth or AOA measurements. Furthermore, the invention can generate target direction-of-arrival or DOA when no DOA or angle-of-arrival (AOA) measurements are made.

It is a further object of this invention to provide an embodiment that does not require modification to the form or structure of existing bearings-only location software, or require developing new software. Another aspect of the invention is to allow the utilization of old emitter-location software by generating new bearing measurements. These bearing measurements will be referred to as "pseudo bearings." The new pseudo bearing measurements use bearing differences, rather than AOA. Geolocation is thus derived strictly from bearing differences.

As noted before, large bias errors cause any conventional bearings-only based system to fail to converge to the true range estimate. Therefore, another object of this invention is to remove the bias from the key geolocation process input, represented mathematically herein by H. The bias or systematic part of the measurement error is emitter frequency, DOA, and receiver sensitivity dependent, and hence may change with time. Therefore, it is another object of this invention to convert this time varying systematic error to an approximately constant bias by controlling the emitter revisit time. The systematic error is characterized by a long correlation time compared with the random error. By updating the bearing difference over a short enough time, the systematic error is essentially constant between updates and subtracts out. This bearing differentiation or differencing may be done in either software or hardware.

BRIEF DESCRIPTION OF THE DRAWINGS

FIG. 2b shows estimate from MGEKF driven by the bearings shown in FIG. 2a;

FIG. 8f shows bearing estimation performance of the invention;

FIGS. 13a–d show the advantages of an AOA/LBI scheme over a conventional SBI/LBI approach.

DETAILED DESCRIPTION OF THE PREFERRED EMBODIMENTS

Figure 1:
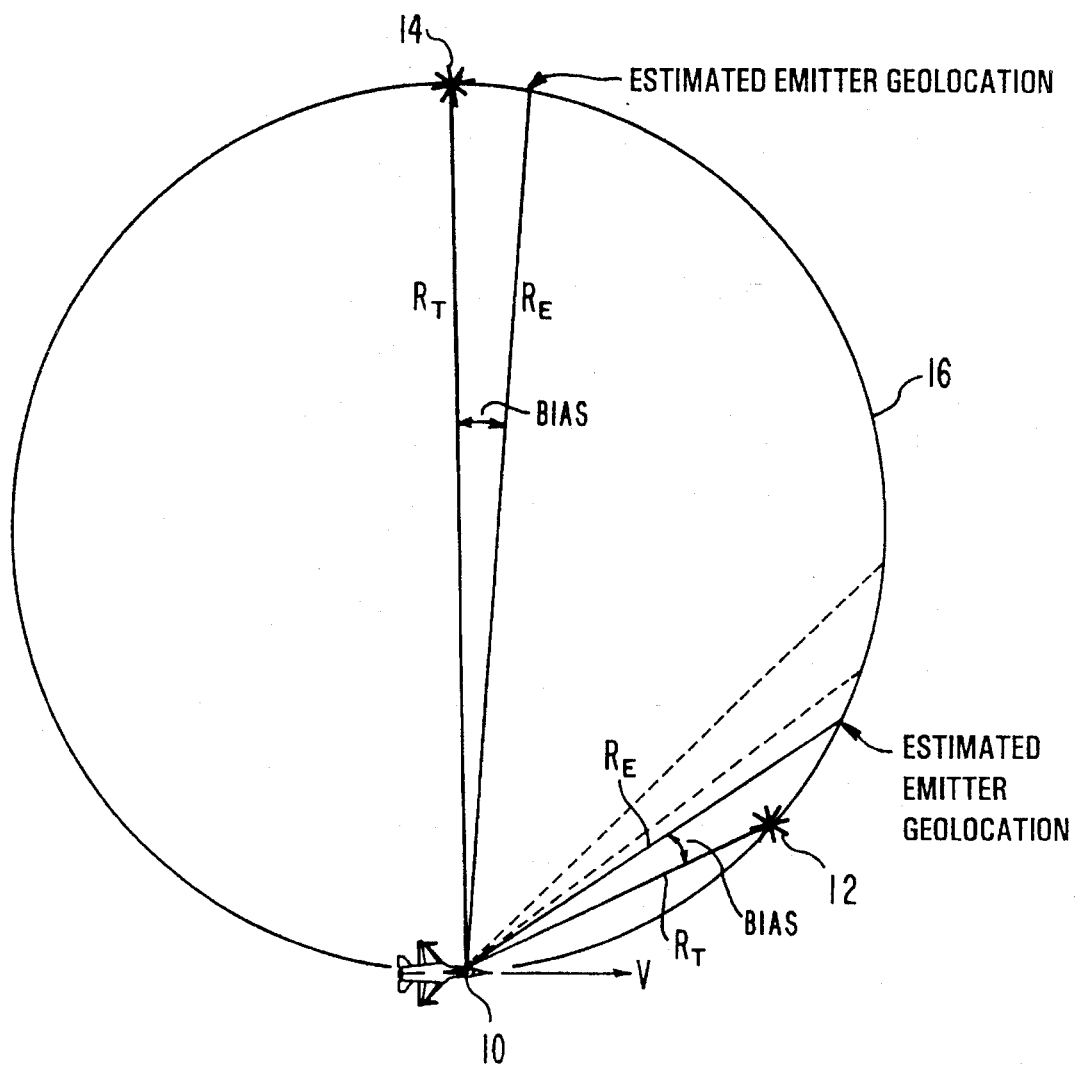
FIG. 1 shows the effect of bias on geolocation accuracy for different sensor-emitter relative bearings.
Figure 2A:
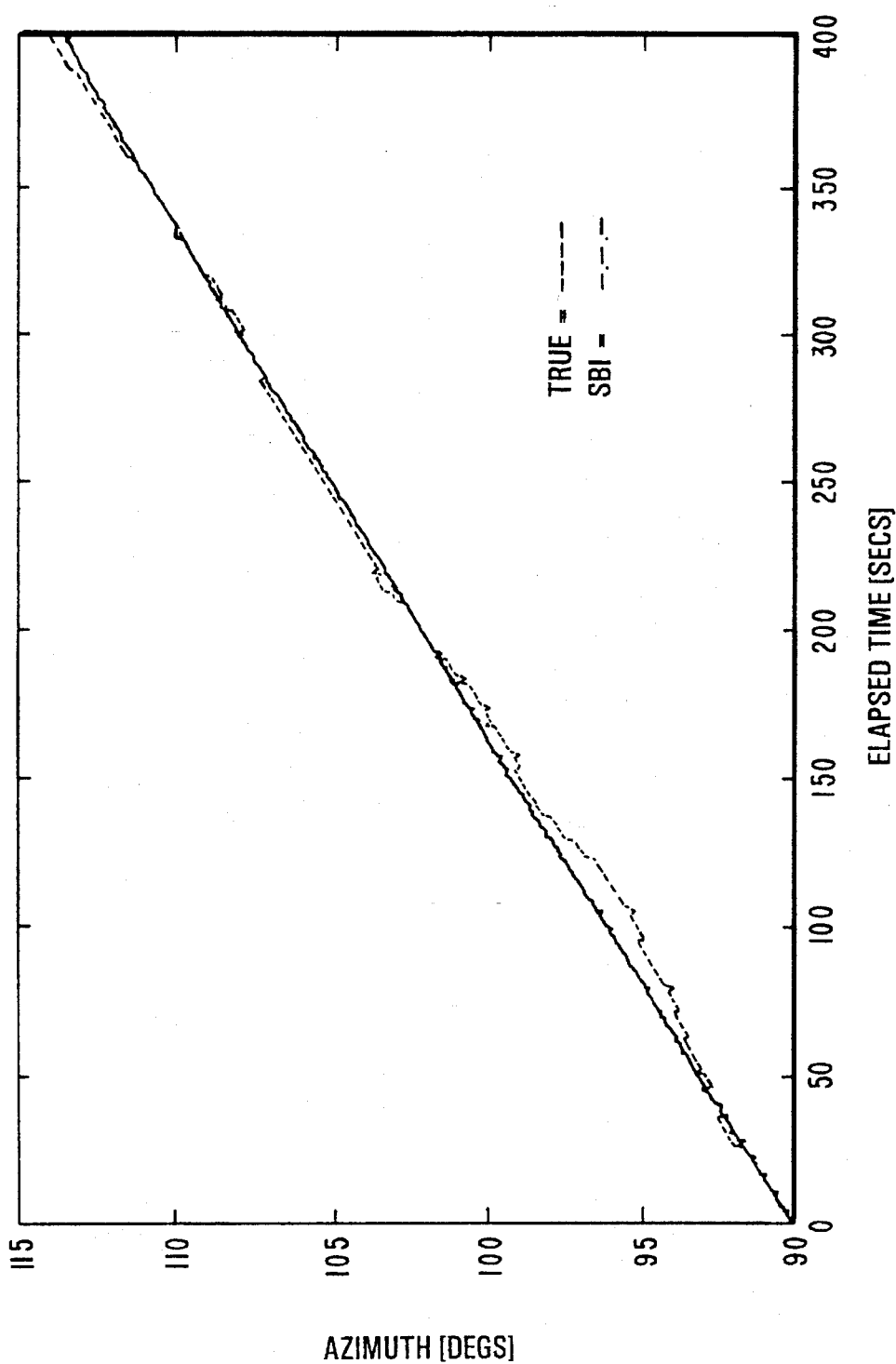
FIG. 2a shows true and measured azimuth values in a system having neglibible phase bias error.
Figure 2B:
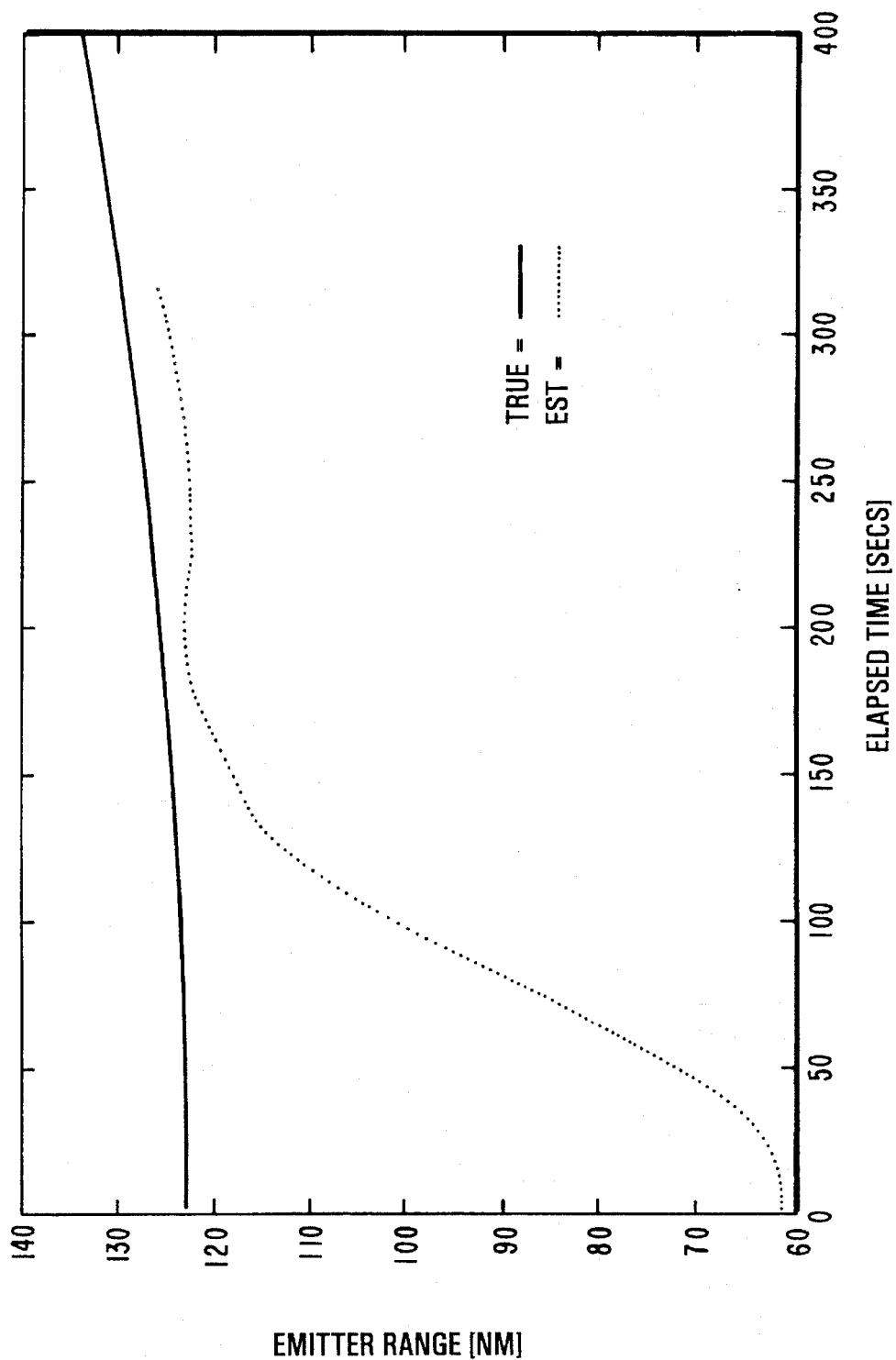
Figure 2C:
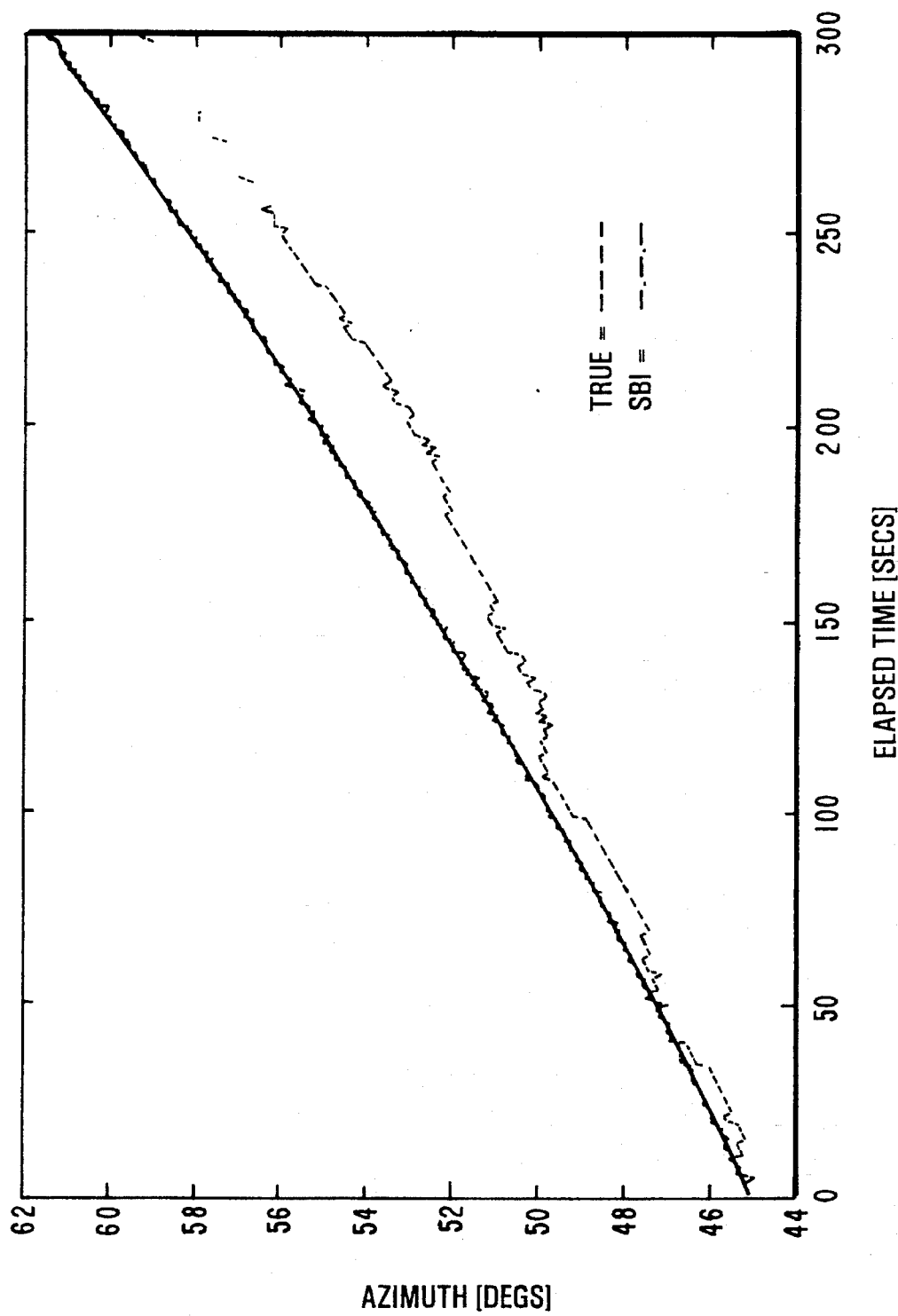
FIG. 2c shows true and measured azimuth values in a system having significant phase bias error.
Figure 2D:
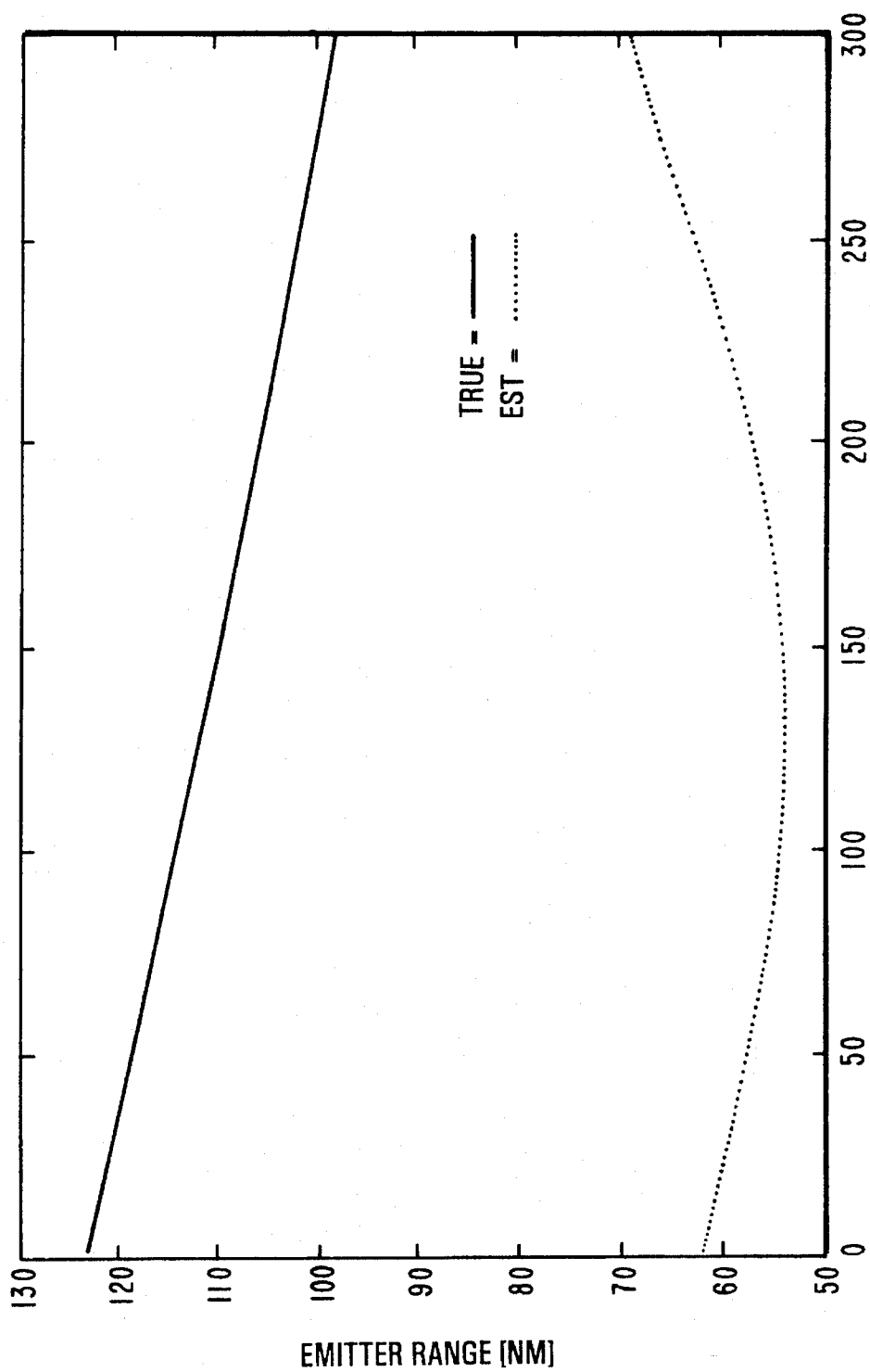
FIG. 2d shows the resultant inaccurate estimate from MGEKF driven by the bearings shown in FIG. 2c.

According to the invention, an apparatus for separating slowly varying systematic errors in emitter bearing measurements from rapidly varying random errors includes means for varying bearing measurement sample times to convert the slowly varying systematic errors to an approximately fixed bias between individual updates, for example using a control system performing steps 401 and 701, and using gate signal 1033. The invention removes the approximately fixed bias by differencing or differentiating the bearing measurements, for instance, using differentiator/ bearing generator 600 or 620. A new bearing measurement is generated without bias using modified emitter bearing measurement process 699 and pseudo bearing generator 691. These unbiased new bearing measurements are used by emitter geolocator processing block 561 to determine geolocation using existing systems.

The invention can use existing amplitude, or amplitude/phase DF systems and add one antenna 601 to perform phase comparison interferometry without calibrating the interferometer to remove phase delay and other phase bias errors. Phase detector 547 and 549 measure phase rate or phase difference from the in phase I and quadrature Q components of the phase measurement. These phase rate or difference measurements are converted to unbiased and unambiguous emitter angular bearing differences using differentiator/bearing generator 600 or 620. These derived angular differences are used to generate emitter geolocation using geolocation processor 345.

The invention provides an apparatus that performs geolocation using emitter bearing differences rather than bearing information, and includes measuring emitter bearing rate of change or bearing differences using phase detector 1025 utilizing signals from a possibly ambiguous interferometer, such as that composed of antennas 1001 and 1003. Geolocation processing block 1043 or 345 uniquely associates loci on which the emitter must lie with the bearing rates and bearing differences. Geolocation uses the loci for uniquely associating a geodetic position of the emitter with the bearing rate of change and bearing difference measurements without using any emitter bearing measurements.

The invention also provides an apparatus that utilizes existing bearings-only location processing such as emitter geolocation processing block 561, without making any bearing measurements. The apparatus of the invention includes a means to measure emitter bearing differences or bearing rates-of-change using emitter bearing measurement processor 365. Also included is a means to generate emitter pseudo bearings from those measurements, in pseudo bearing generator 602, these pseudo bearings being input to the emitter geolocator 561 in lieu of actual bearing measurements.

According to the invention a method to utilize biased bearing measurements made from multiple platforms, includes generating unbiased pseudo bearings on each platform individually, such as from pseudo bearing generator 602 positioned on each platform. These pseudo bearings are combined in a bearings-only geolocation processing, which may be identical to any single platform geolocation processing by transmitting locus and other ESM data distinguishing the emitter to cooperating platforms as shown in steps 416 and 417.

The invention also provides a method and apparatus to utilize bearing change measurements made from multiple platforms including means to measure emitter bearing rate of change or equivalently, bearing differences utilizing possibly different sensors, such as an ambiguous interferometer on one platform and TDOA system on another as shown represented by the emitter bearing measurement process 335. Emitter loci generator 339 uniquely associates loci on which the emitter must lie with the bearing rates or bearing differences measured by the respective sensors. Geolocation processing 345 utilizes the loci to uniquely associate the emitter geodetic position with the rate or difference measurements without necessarily directly using any emitter bearing measurements.

Figure 3A:
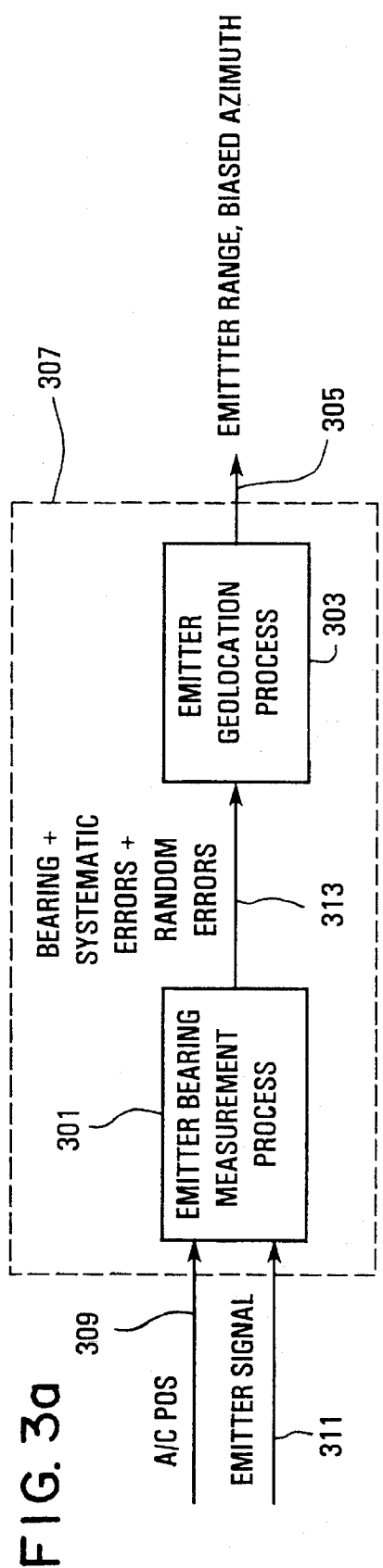
FIGS. 3a and 3b shows a conventional bearings-only passive geolocation system.

First consider a conventional bearings-only emitter location system as shown in FIGS. 3a. System operation for bearings-only passive ranging can be modeled by the following state equations:

$$\vec{x}(i+1) = \vec{x}(i) + \begin{bmatrix} V_x \\ V_y \end{bmatrix} \Delta t \qquad (1)$$

$$H \cdot \vec{x} = 0 \qquad (2)$$

where $H = [\cos(a) - \sin(a)]$, the input matrix derived from emitter bearing measurements a;

$$\vec{x} = \begin{bmatrix} r_x \\ r_y \end{bmatrix},$$

the emitter position in the local level frame; and $$\begin{bmatrix} V_x \\ V_y \end{bmatrix}$$

=sensor, or observer average velocity between bearing updates at times $\Delta t$ apart.

This system description is not unique. The use of these particular equations to describe the system leads naturally to a form of geolocation called the pseudolinear tracking filter, fully presented in V. J. Aidala, "Kalman Filter Behavior in Bearings-Only Tracking Applications", IEEE Trans. on Aerospace and Electronics Systems, AES-15, 1979. To utilize the MGEKF formulation, the definition of H is modified, although the form of the equations remains the same. Such modifications are not important, and it will be clear from the following description of the technique how to apply it to any bearings-only estimation approach.

H mathematically represents the emitter bearing measurement process block shown as 301 in FIG. 3a. In actual systems, system 307 receives aircraft position on signal line 309 and emitter signals on signal line 311. The emitter bearing measurement process in block 301 may involve antennas, receivers and associated hardware as well as software. The emitter bearing measurement process 301 generates bearing, systematic errors and random errors as indicated on signal line 313. The emitter geolocation process in block 303, is based on the mathematical model in equations 1 and 2. The system output on signal line 305 is the estimate of $x_{i+1}$, or an equivalent emitter location description derived from this estimate.

Figure 3B:
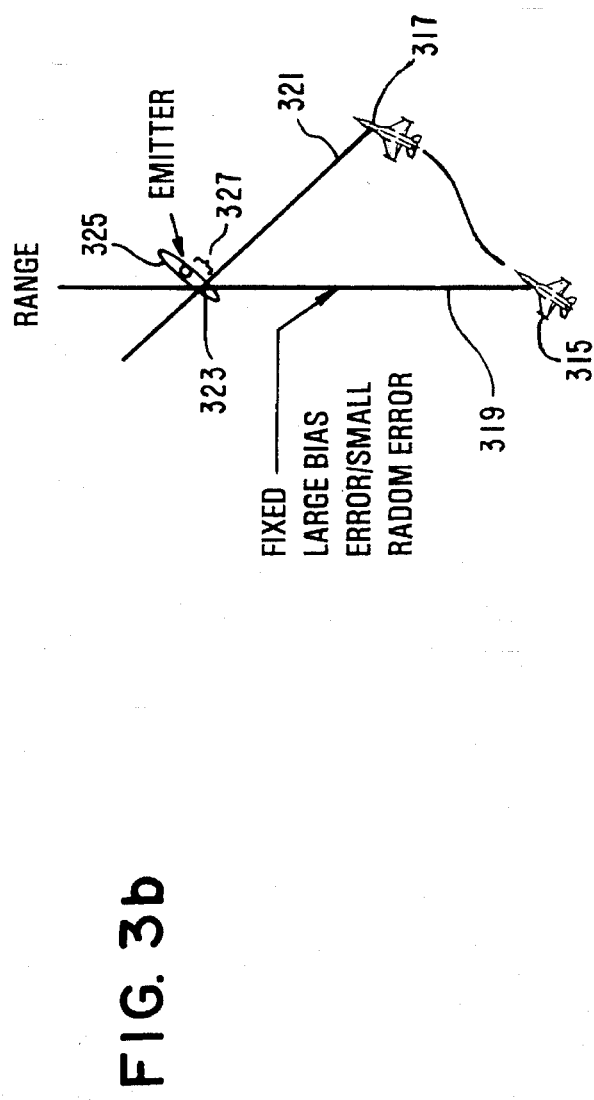

The emitter geolocation process block 303 uses two bearings, 319 and 321, generated at aircraft positions 315 and 317, respectively as shown in FIG. 3b. The intersection of the bearings 323 is the determined emitter position. If an azimuth bias is present, the actual emitter position, 325, differs from the determined emitter position 323, by an error 327.

Two preferred embodiments for generating the bearing differences will be described. The distinction between the two has to do with the manner in which the bearing differences appearing in equation 3, or equivalent representations, are obtained. Thus, as shown below, a system embodied by the block diagram in FIG. 3a can be converted to either of the systems shown in FIG. 3c or 3f.

Figure 3C:
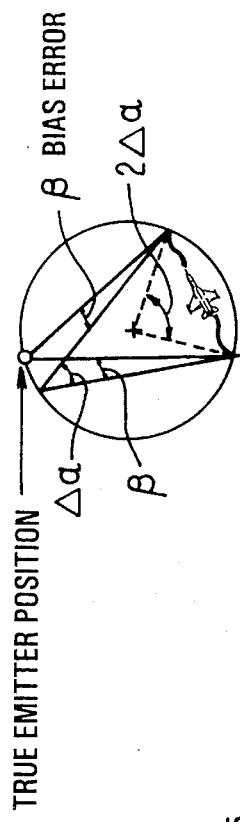
FIGS. 3c and 3d show one embodiment of the invention generating circle-loci on which an emitter must lie.
Figure 3D:
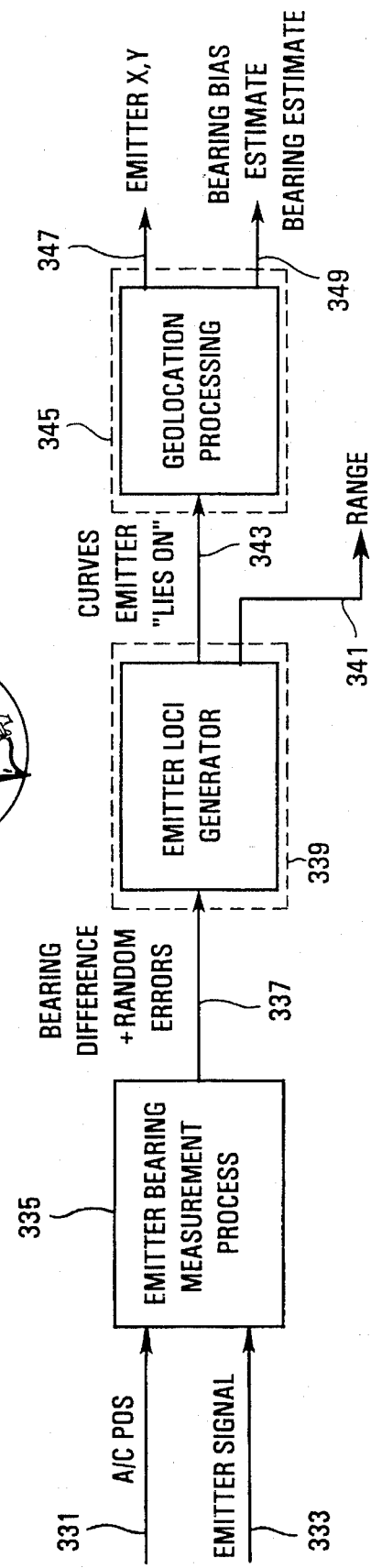
Figure 3D:
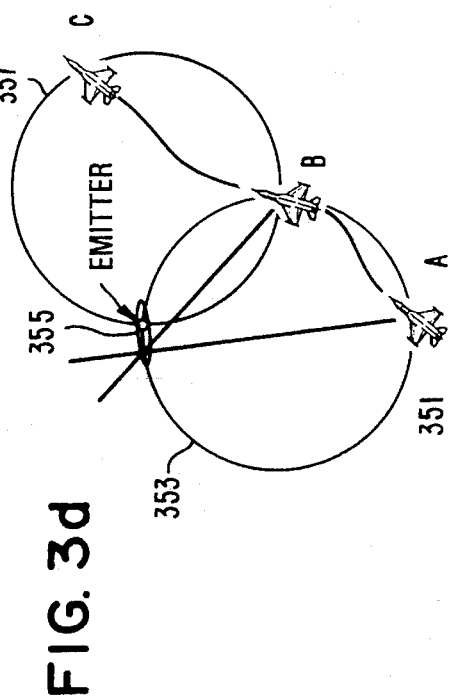
Figure 3E:
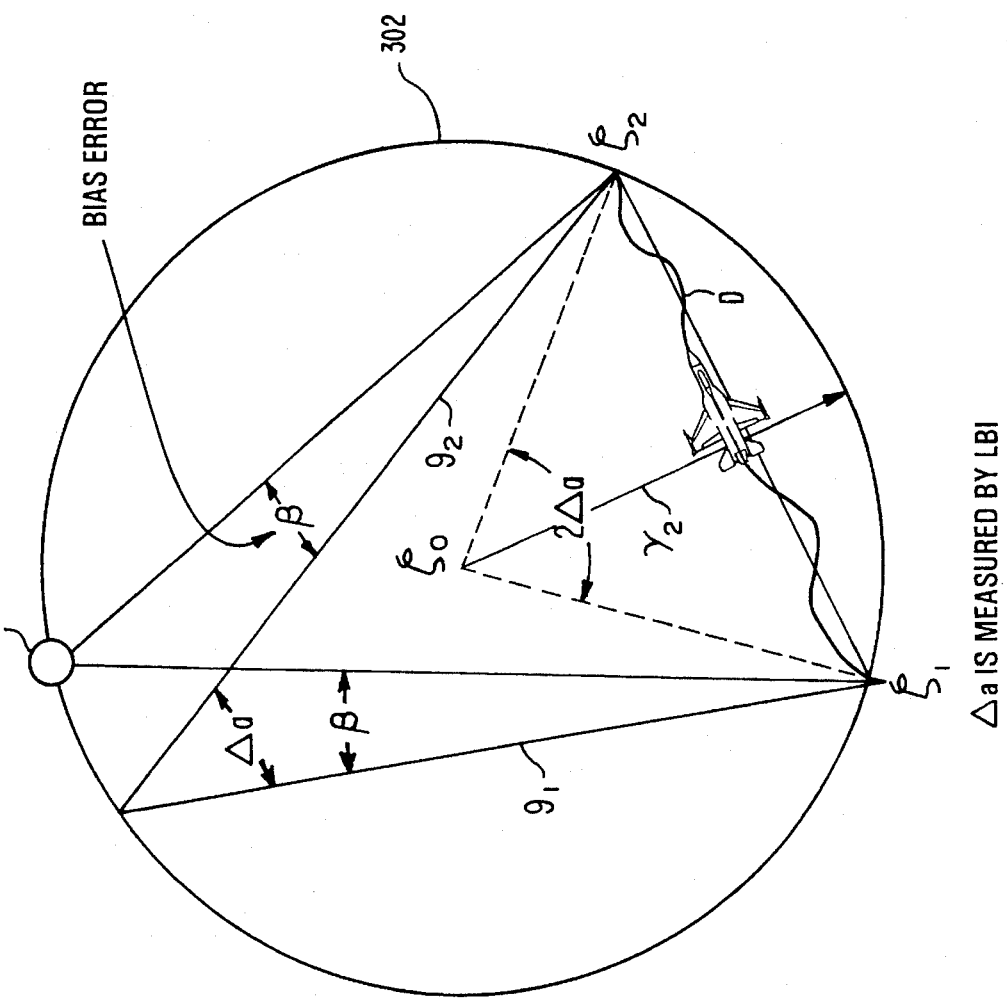
FIG. 3e shows an enlarged view of generating unique circle-loci from bearing differences.
Figure 3F:
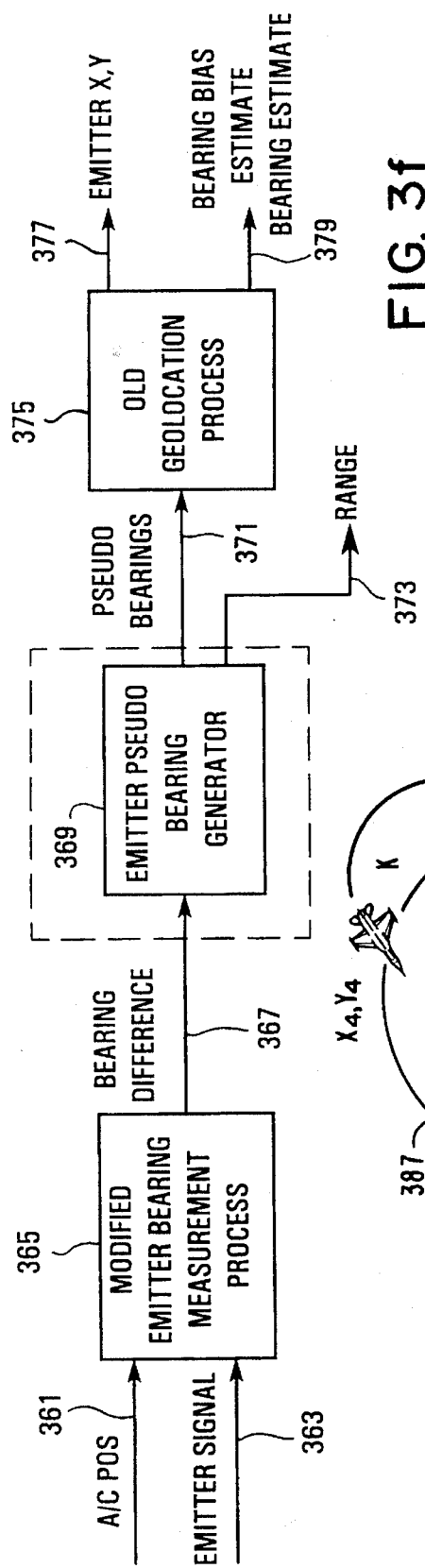
FIGS. 3f and 3g show a second embodiment of the invention utilizing pseudo bearings.

FIGS. 3c–3h indicate how this invention alters the original passive location system shown in FIG. 3a to perform new tasks. FIG. 3c shows a general manner in which this invention can be implemented. This realization may involve implementing geolocation process 303 as discussed in detail later herein. FIG. 3f shows that the invention can also be realized in a way that lets inputs be treated as unbiased azimuth or bearing measurements. This is desirable because new software development, debugging, integration and testing is an involved process. Therefore it is highly beneficial to make changes that greatly improve overall performance, but have little impact on current software. Thus the invention provides an embodiment that does not require modification to the form or structure of the existing bearings-only location software, or require developing new software.

For either realization shown in FIGS. 3c and 3f, hardware modification to the sensor may be possible and desirable in some existing systems. In particular, many existing amplitude DF systems, with minimal hardware modification, can have greatly enhanced accuracy in making bearing rate or difference measurements, as is shown.

Although the invention, as depicted in FIG. 3f, will generally involve both hardware and software subsystems to implement a particular embodiment, mathematically such an embodiment can be represented by a change to the measurement matrix H as follows:

$$H^* = \begin{bmatrix} 2(C_{x_{i+1}} - C_{x_i}) \\ 2(C_{y_{i+1}} - C_{y_i}) \end{bmatrix} \quad (3)$$

where in $C_{x_i}$, $C_{y_i}$ the subscripts $x_i$, $y_i$ refers to the sensor (x,y) level frame position at measurement time i and i+1, and the $C_{x,y}$ are defined, at a given time, by $$C_x = \frac{1}{2} \left( [x_1 + x_2] + \left( \frac{\sin(2\Delta a)}{1 - \cos(2\Delta a)} \right) [y_1 - y_2] \right) \quad (4)$$

$$C_y = \frac{1}{2} \left( [y_1 + y_2] + \left( \frac{\sin(2\Delta a)}{1 - \cos(2\Delta a)} \right) [x_1 - x_2] \right) \quad (5)$$

Figure 3G:
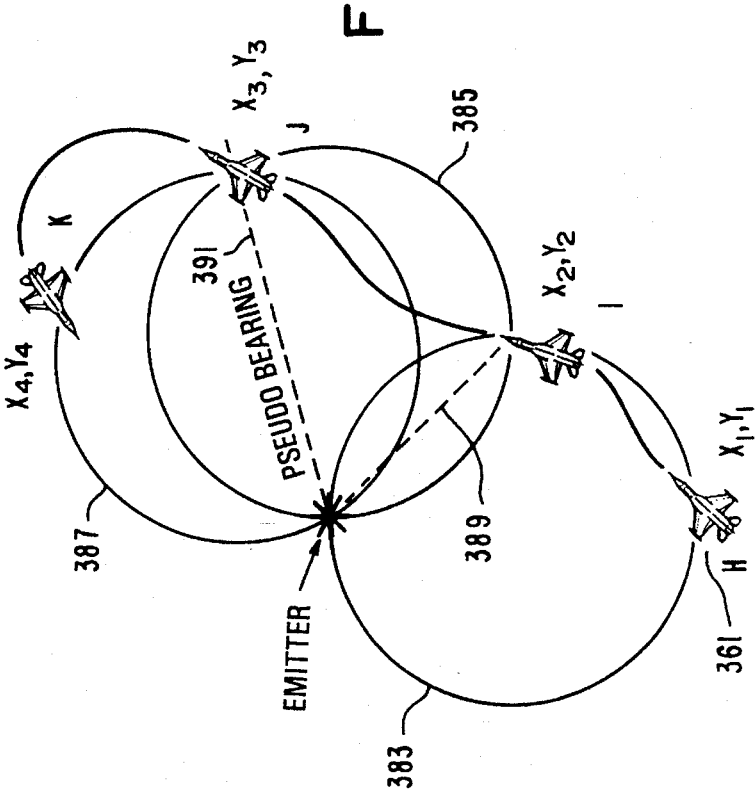

In these equations $\Delta a$ refers to the change in emitter bearing between updates at locations represented by coordinates $x_1$, $y_1$ and $x_2$, $Y_2$, as shown in FIG. 3g. Hence in the new measurement equation only bearing rates appear. This means that any constant bias or slowly varying systematic error in the measurement between updates will be subtracted out.

The use of this new measurement equation 3, which has the same form as the old equation 2, means that the same software can be used to determine location using this new technique, as with the conventional bearings-only approach. This can be seen more clearly when it is realized that the above equation defines a new bearing, or pseudo bearing estimate given by $$a_{pseudo} = \arctan\left( \frac{C_{x_{(i+1)}} - C_{x_i}}{C_{y_{(i+1)}} - C_{y_i}} \right) \quad (6)$$

Hence $a_{pseudo}$ can be used in any bearings-only approach to derive geolocation.

Figure 4:
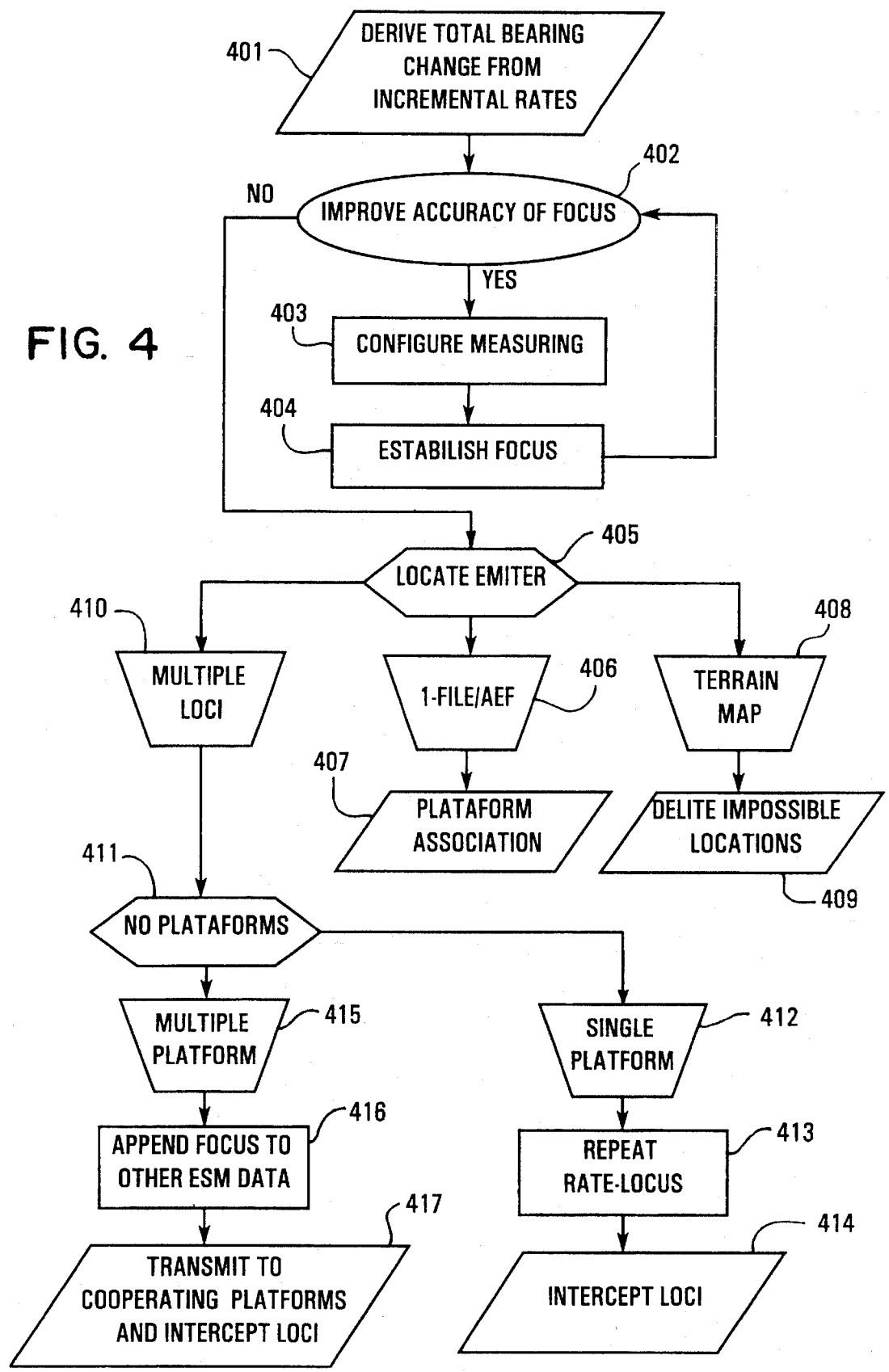
FIG. 4 is a flow chart showing the system/software interaction in the invention.

In particular, it can be used with other single platform techniques such as the MGEKF, or multiple sensor platforms. One difficulty in using multiple platforms to do geolocation is the presence of different systematic errors in the emitter bearing measurements on the different platforms. The invention eliminates this problem. Furthermore, $a_{pseudo}$ can be used with geolocation approaches that employ other assets, such as terrain maps, or a priori information such as that contained in an information or I-file, or an active emitter file (AEF) carried aboard the sensor platform. This is shown in FIG. 4 and discussed more fully later herein.

It is not necessary to actually measure emitter DF using the invention. This can be seen in FIG. 3e by noting that the sensor locations in the level frame represented by the complex numbers $\zeta_1$ and $\zeta_2$ are related uniquely to a circle 302 passing through them with center $\zeta_0$ and emitter bearings, $a_1$ and $a_2$, measured at two points by $$\begin{bmatrix} \zeta_1 \\ \zeta_2 \end{bmatrix} = \begin{bmatrix} 1 & \exp(ia_1) \\ 1 & \exp(ia_2) \end{bmatrix} \begin{bmatrix} \zeta_0 \\ r_c \end{bmatrix} \quad (7)$$

Thus, the unique circle center $\zeta_0$ and radius $r_c$ are given by $$\zeta_0 = (1 - \exp(i\Delta a))^{-1} \zeta_1 + (1 - \exp(-i\Delta a))^{-1} \zeta_2 \quad (8)$$

and $$r_c^2 = 2(1 - \cos(\Delta a))^{-1} D^2 \quad (9)$$

where $\Delta a = a_2 - a_1$,

D=distance between sensor update locations $\zeta_1$ and $\zeta_2$.

Equations 4 and 5 are derived from the line in the level frame defined by the intersection of two such circles. There are other ways to relate the circles described by equations 8 and 9, lines of pseudo bearing described by equation 6, and unique emitter geolocation. These alternative descriptions may be more suitable for a particular application than the form given here. For instance, it is not necessary to introduce pseudo bearings. This invention allows previously developed bearings-only geolocation software to be utilized, but in a new system it may more beneficial to form a set of circles, and perform an optimal estimation for the unique emitter location given by the intersection of these circles, thus foregoing the use of the pseudo bearings. For example, the emitter will lie close to the circle given by $$(Re[\zeta_0] - x)^2 + (Im[\zeta_0] - y)^2 = r_c^2 \quad (10)$$

and a maximum likelihood estimator can be designed to find the unique intersection of multiple circles as long as the observability conditions presented in Gavish and Fogel are met. The loci are described herein are in the form of circles by way of illustration and not by way of limitation, as those of ordinary skill will recognize that other curves may be appropriate depending on the application.

Those familiar with systems for bearings-only geolocation will see many variations on the basic approach described here for associating different loci with bias-free bearing differences, such that the emitter would lie on these curves if no random errors were present. The advantage to specializing these loci to lines is that then pseudo bearings can be formed, and old software used, as just described. The more general implementation where the loci can be circles is shown in FIGS. 3d and 3e. FIG. 4 shows how the geolocation system of the invention and software interacts, depending on the number of loci generated.

As indicated in these figures, a unique locus, e.g. circle 302 as defined by equation 10, or line having the slope given by equation 6, is associated with a bearing difference. The way these differences can be actually generated is discussed further herein. The system interaction then depends on the number of bearing differences, and hence unique loci, formed. If there is only one or two loci on which the emitter can lie, a unique emitter geolocation may still be derived by association with a priori locations given in an information file (I-file) or active emitter file (AEF). A unique position, or at least smaller locus of possible positions, may also be derived by association with a terrain map. If multiple loci are available they can be intersected to determine the unique emitter location, whether the loci are generated on a single or multiple platforms.

As previously indicated, FIGS. 3c and 3d show a general embodiment of the invention. In FIG. 3c, aircraft position on signal line 331 and emitter signal information on signal line 333 are received by a means for performing an emitter bearing measurement process 335. Any method that can produce bearing differences can be used, such as time difference of arrival (TDOA) or frequency difference of arrival rather than just phase. As would be known to those of ordinary skill, this means would include such processing equipment as necessary to produce signals on signal line 337. These signals would include bearing difference and random errors. The bearing difference and random errors on signal line 337 are applied to emitter loci generator 339 which also includes processing means to generate range information on signal line 341 and emitter curves on signal line 343. The emitter curve information on signal line 343 is provided to a geolocation processing block 345 which contains processing means for generating emitter information in the form of xy coordinates on signal line 347 and bearing bias estimates or bearing estimates on signal line 349.

Using this approach, unbiased bearing differences can be uniquely associated with curves, e.g., circles such as those discussed above, in emitter loci generator 339 and the curves intersected to find the emitter position in the geolocation processing block 345. This is illustrated in FIG. 3d.

In FIG. 3d, a platform 351 moves from position A to position B. Based on the bearing difference Δa, as shown in FIG. 3e, a unique curve 353 is determined containing the positions A, B and the emitter. This is also shown in FIG. 3e where circle 302 passes through true emitter position 304. In spite of the fact that a circle has been generated, the absolute location of the emitter is still ambiguous. Therefore, as the platform moves from position B to position C, a second circle 357 is generated. The second circle also passes through emitter 355. Thus, the intersection of circles 353 and 357 defines the location of emitter 355.

It should be noted that in many circumstances, emitter 355 may be turned off before the second circle 357 is generated. In such circumstances, since it is known that the emitter lies on the first circle 353, but it is not possible to determine an unambiguous location since the second circle was not generated, a processor would look to an intelligence file (I-file) or an active emitter file (AEF) to perform processing that would rule out or confirm the possibility of an emitters presence on circle 353. For example, an intelligence file could contain latitude and longitude information defining known locations of emitters. Similarly, a terrain map could be accessed to determine which positions on the circle could or could not have an emitter present. Of course, it will be known to those of ordinary skill that other signals intelligence data bases may be accessed to assist in processing such information.

FIG. 3f illustrates a system which facilitates the use of conventional bearing only algorithms in existing systems. In FIG. 3f, aircraft position is received on signal line 361 and emitter signal information on signal line 363 to a modified emitter bearing measurement process block 365. Block 365 contains known processors to obtain a bearing difference on signal line 367. Signal line 367 is applied to emitter pseudo bearing generator 369, which produces range information on signal line 373 and pseudo bearing information on signal line 371. The development of pseudo bearing information is illustrated in FIG. 3g where platform 381 moves through positions H, I, J, K. (The positions are also indicated as $x_1$, $y_1$, etc.) As previously discussed, in traversing between any two positions, a circle including each of the positions and the emitter can be generated using the techniques for emitter loci generation. Thus, circles 383, 385 and 387 are generated. From these three circles, two pseudo bearings 389, 391 are generated between the points where the circles intersect. Two bearings are generated to accommodate conventional software, which typically applies triangulation methods for locating an emitter using bearing information. Unlike conventional systems in which the bearing information contains bias errors, the pseudo bearing information is unbiased bearing information. Applying the unbiased bearing information on signal line 371 to a conventional geolocation processor 375, allows the conventional processor to develop an accurate bearing. It is not necessary to reprogram existing systems, because the bearing information provided in a standard form although with enhanced accuracy. It should be noted that three circles and four measurements are required to generate the two pseudo bearings to accommodate most conventional software.

Because bias errors are eliminated from the processing, the invention also allows information to be obtained from multiple platforms. For example, in either FIG. 3d or 3g, the information used to generate the circles need not come from a single platform. That is, each circle can be generated by a separate platform. Typically, the platforms provide each other with distinguishing characteristics of the emitter signals so that they can coordinate and process information to determine an accurate bearing of a particular emitter. As previously noted, since the bias error is eliminated, differences in the bias errors between the systems have no effect. Thus, for the first time, the invention permits the combination of multiple measurements from different platforms.

Figure 3H:
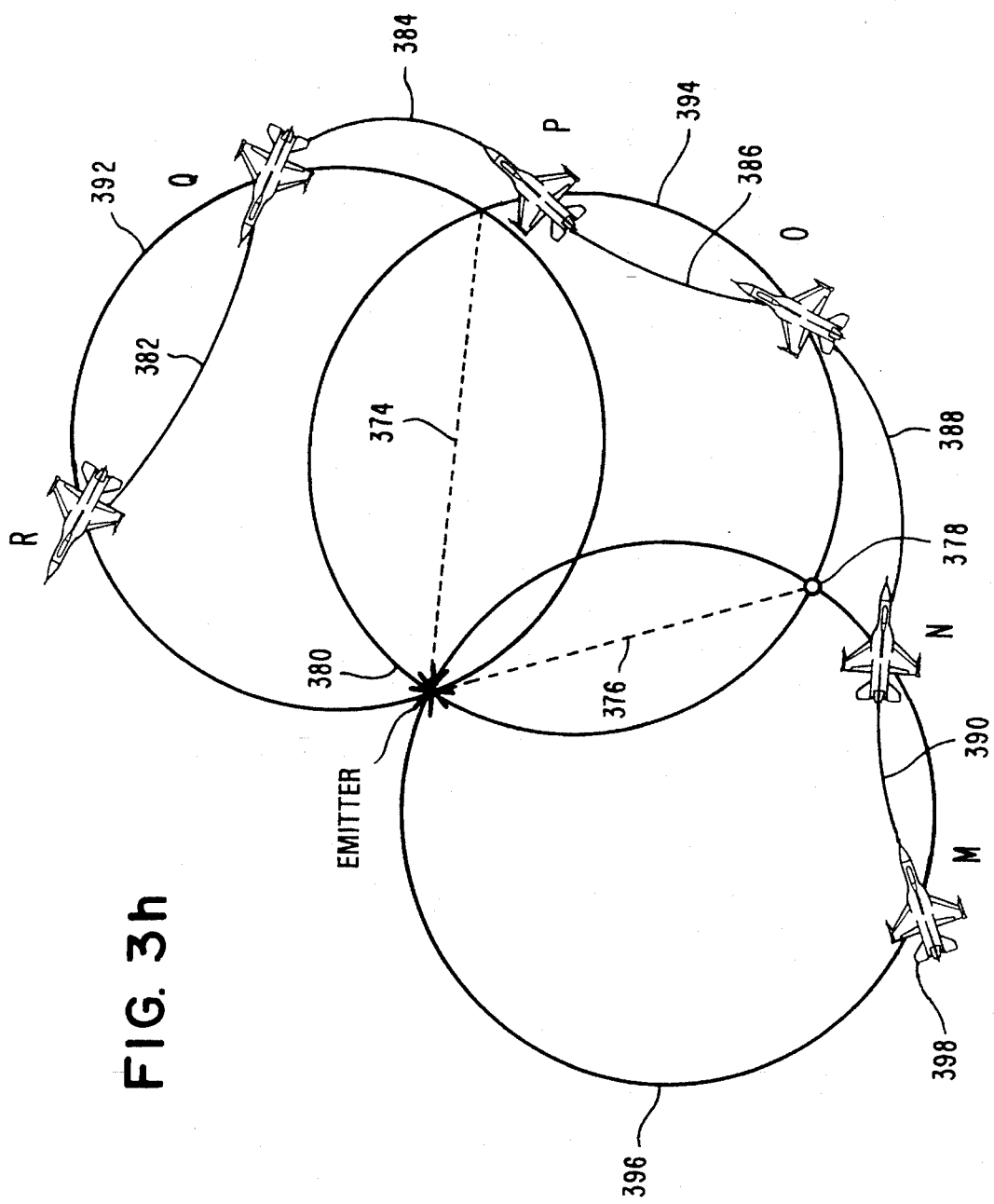
FIG. 3h shows another possible platform path by which circle loci and pseudo bearings are generated.

It is also possible for an emitter to operate in a "blinking" mode in which the emitter periodically turns itself on and off. This situation is illustrated in FIG. 3h. FIG. 3h, a platform 398 traveling from position M to position N generates first circle 396 based on the bearing information. As platform 398 travels along path 390 between points M and N, the emitter is in the on or transmitting state. However, during the next time period as the platform travels from N to O along path 388, the emitter is turned off and no detections are made. As the platform travels along path 386 between points O and P, the emitter is again transmitting and a second circle 394 is generated. As the platform travels from position P to Q along path 384, the emitter is turned off and again no signals are generated. At position Q, the emitter again turns on and as platform 398 travels from position Q to position R along path 382, circle 392 is generated.

It is important to note in this case that, because the emitter has been turned off for some period of time, the intersection of circles 396 and 394 alone cannot be used to determine the precise location of the emitter. Recall that in the previous illustrations in FIG. 3d and 3g, the intersection of two circles was sufficient to identify the location of the emitter because the platform itself was also at the intersection of two circles. Since the emitter could not be located at the same position as the platform, the emitter location was defined. In the case in FIG. 3h, however, circles 396 and 394 intersect at two points where the platform was not present. Thus, it is not possible from the mere intersection of the circles 396 and 394 to identify the emitter position. Either a third circle 392 is required or some measure of azimuth sufficient to distinguish whether the emitter is located at position 378 or at position 380 is required, if only two circles are generated. It should also be noted that pseudo bearings 376 and 374 do not lie on the true track of platform 398. This is again because the circles do not intersect at the position of the platform.

FIG. 4 is a flow diagram illustrating various modes of operation of a system according to the invention. In step 401 total bearing changes derive from incremental rates. As previously described, previous approaches have tried to maintain a fixed relative bearing over updates to minimize bias error since bias error is strongly influenced by relative bearing. The invention uses updates with a period of typically 0.5 to 2 seconds. Bias or systematic error is assumed to be constant over the update period. The overall bearing is determined over typically 10 to 180 seconds. The incremental bearings are summed to get the overall bearing. Another way to describe such an approach that the incremental rates are differentiated to eliminate the bias error and integrated over the longer period to eliminate random error.

In step 402, it is determined whether the accuracy of the locus is sufficient to complete a circle, such as those illustrated in FIGS. 3d, 3e, 3g and 3h. The magnitude of the bearing difference depends on translational motion. If the bearing difference is determined to not be sufficiently large compared to noise e.g. the aircraft has been flying towards the emitter, then it may be desirable iterate in order to use a larger bearing spread to reduce noise effects. If it is necessary to improve the accuracy of the locus, then measuring is continued in step 403 and the locus established in step 404. The process of steps 402–404 is repeated as necessary. When it is no longer necessary to improve the accuracy of the locus, control is transferred from step 402 to step 405 in which the emitter is located.

As previously discussed, since an emitter can be located anywhere on the locus of points, it is not possible with only a single locus to unambiguously locate the emitter. Where only a single locus can be generated, e.g., the emitter has turned off, step 406 can be used to access an information file or active emitter file data base. A platform can then determine in step 407 if an emitter is associated with the locus. Alternatively, in step 408 a terrain map can be accessed so that, based on the terrain, impossible emitter locations can be deleted in step 409.

The preferred alternative is the generation of multiple loci in step 410. In step 411, the processor determines the number of platforms cooperating in obtaining bearing information. Steps 412, 413, and 414 deal with the single platform situation. If it is determined in step 412 that only a single platform is determining the bearing information, according to the invention, processing is performed to draw another circle or repeat the bearing rate locus, in step 413. The intersection of at least two circles is determined in step 414 so that the emitter can be located. The effects of random errors can be reduced or eliminated by using multiple circles and weighted least squares or Kalman filtering processing.

If step 415 determines that multiple platforms are in use, then in step 416, the locus is appended to other electronic surveillance measurement (ESM) data. This ESM data is used to identify the emitter and for coordination purposes, to distinguish the characteristics of the emitter sought so that all the platforms can coordinate the information to identify the emitters. In step 417, the locus is transmitted to cooperating platforms and the intercept loci determined, to locate the emitter unambiguously.

It should be noted that, as previously discussed, the loci used in FIG. 4 may be a circle or any other locus of points appropriate to a particular application.

Figure 5:
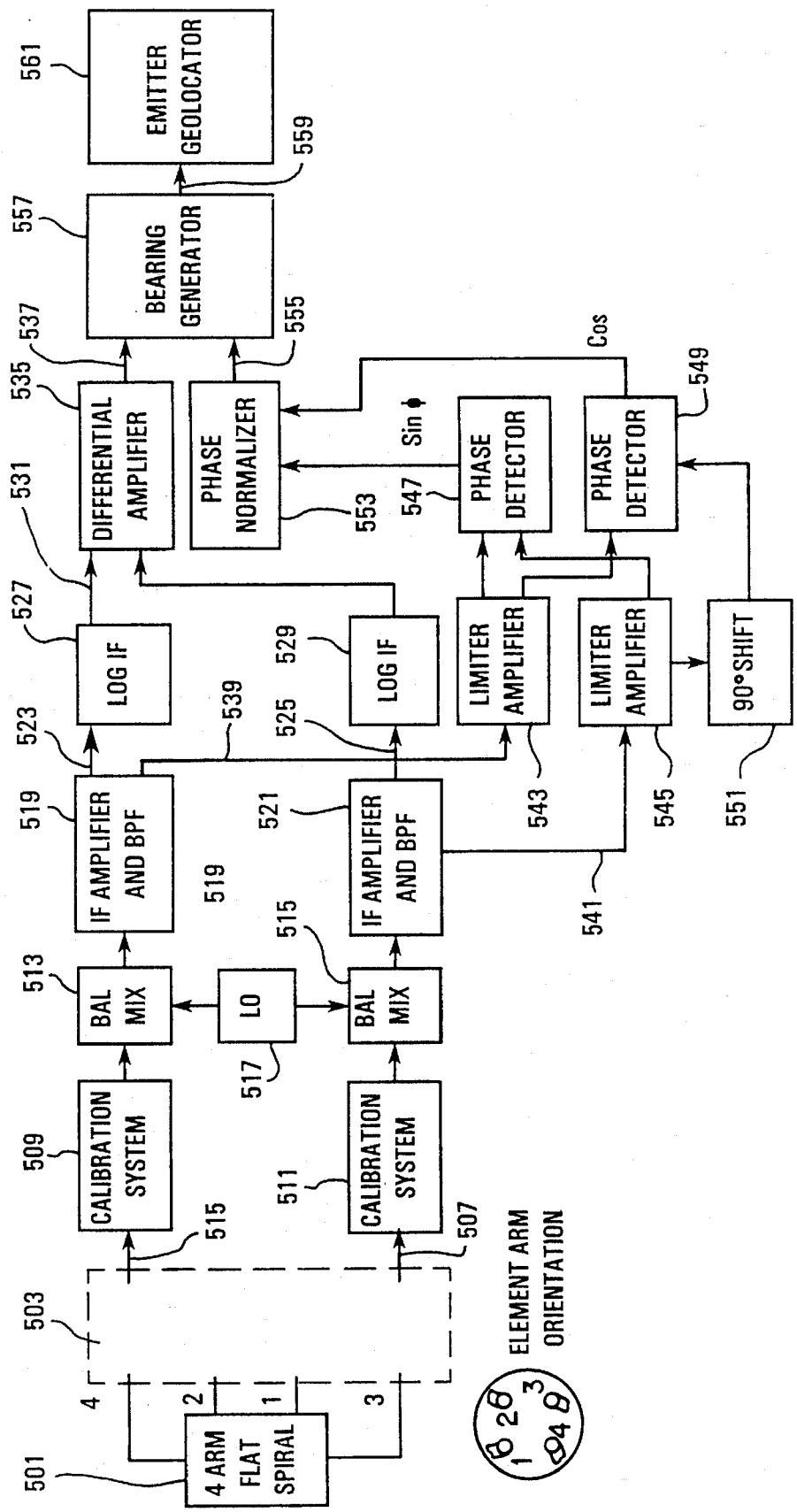
FIG. 5 shows a generic diagram for a typical two channel phase and amplitude comparison wideband DF system used on many military aircraft for threat radar warning.

FIG. 5 shows a typical RW two-channel phase and amplitude comparison monopulse direction-finding system that provides azimuth and elevation with two receiver channels and a single antenna element. Such systems are disclosed by L. G. Bullock, G. R. Oeh, and J. J. Sparagna in "An Analysis of Wide-Band Microwave Monopulse Direction Finding Techniques," IEEE Transactions on Aerospace and Electronic Systems, Vol. AES-7, No. 1, January, 1971.

Figure 6A:
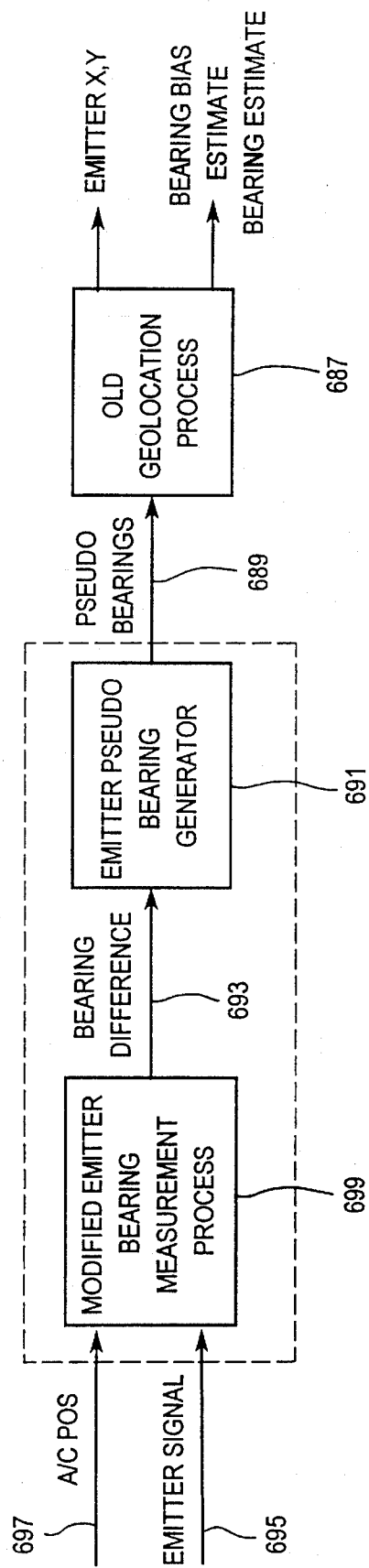
FIGS. 6a–6c show that modification to the system in FIG. 5 to implement the invention includes the addition of one antenna and phase processing software, using a first approach to generate bearing differences.

FIG. 6a is a block diagram of precision geolocation subsystem which employs a modified phase comparison mode. In both FIGS. 6a and 6d, aircraft position and emitter signal information is provided to a modified emitter bearing measurement processing block 699 on signal lines 697 and 695, respectively. Such an emitter bearing measurement process block was discussed previously with respect to FIG. 3c, and in particular, emitter bearing measurement processing block 335. Bearing difference information is provided on signal line 693 to emitter pseudo bearing generator 691 which produces pseudo bearings on signal lines 689, as previously discussed. In the case of FIG. 6d, range information is also produced on signal line 687. The range information is available in FIG. 6d without geolocation processing, since the embodiment in FIG. 6d includes the AOA/LBI processing including range information as shown in FIG. 6f and discussed further herein. As previously discussed, in the case of both FIGS. 6a and 6d, the pseudo bearing information on signal line 689 is provided to a conventional geolocation processor 687, such as would be implemented in the conventional system in FIG. 5.

As illustrated in FIG. 5, an amplitude/phase DF and emitter geolocation system includes an antenna such as four-arm flat spiral 501 connected to a network 503 to produce sum and difference patterns on signal lines 505 and 507, respectively. The configuration of network 503 will be known to those of ordinary skill in the art, for example, the magic Tee and 90° hybrid network disclosed by Bullock, et al. at page 195. The sum and difference signals 505 and 507 are each applied to a calibration system 509, 511, respectively, with outputs applied to balance mixers 513 and 515, respectively. Each balance mixer receives a signal from local oscillator 517 to create an IF signal which is applied to the IF amplifiers and band pass filters 519 and 521 in each channel, respectively. An output, 523 and 525 from each IF amplifier is applied to logarithmic amplifiers 527, 529, respectively. The outputs of these logarithmic amplifiers are applied on signal lines 531 and 533 to differential amplifier 535 which produces amplitude ratio information, which is proportional to the angle or boresight of the emitter, on signal line 537, as discussed by Bullock et al.

Outputs 539 and 541 from IF amplifiers 519 and 521, respectively, are applied to limiter amplifiers 543 and 545, respectively. The output of limiter amplifier 543 is applied to phase detector 547 and phase detector 549. Phase detector 549 also receives the output of phase shifter 551 which receives an output from limiter amplifier 545. Limiter amplifier 545 also provides an output to phase detector 547. As a result, in phase and quadrature outputs are produced by phase detectors 549 and 547, respectively. These are applied to phase normalizer 553 which produces phase angle information, which is the measure of rotational angle about the antenna boresight of the emitter plane on signal line 555, as discussed by Bullock et al. The phase angle and amplitude ratio information on signal lines 555 and 537 is applied to bearing generator 557 which, on signal line 559 provides an input to emitter geolocator 561.

Degradation in the DF measurement occurs because of systematic errors caused by antenna error gradients in the amplitude and phase channels and random errors generated by thermal noise in the sum and difference channels. The DF accuracy is thus a function of received power, or equivalently signal-to-noise ratio (SNR), and emitter off-boresite angular position in the antenna patterns. Typical rms ($1\sigma$) bearing errors are on the order of 4° to 5° but can be as bad as 20° for weak signals emanating from emitters on the edge of the field-of-view (FOV). In demonstrating performance of the invention this worst case error will be assumed. Modifications to the two channel DF systems required to eliminate this large systematic error and produce emitter geolocation to a precision equivalent to that of systems measuring bearing to within fractions of a degree is described next.

Figure 6B:
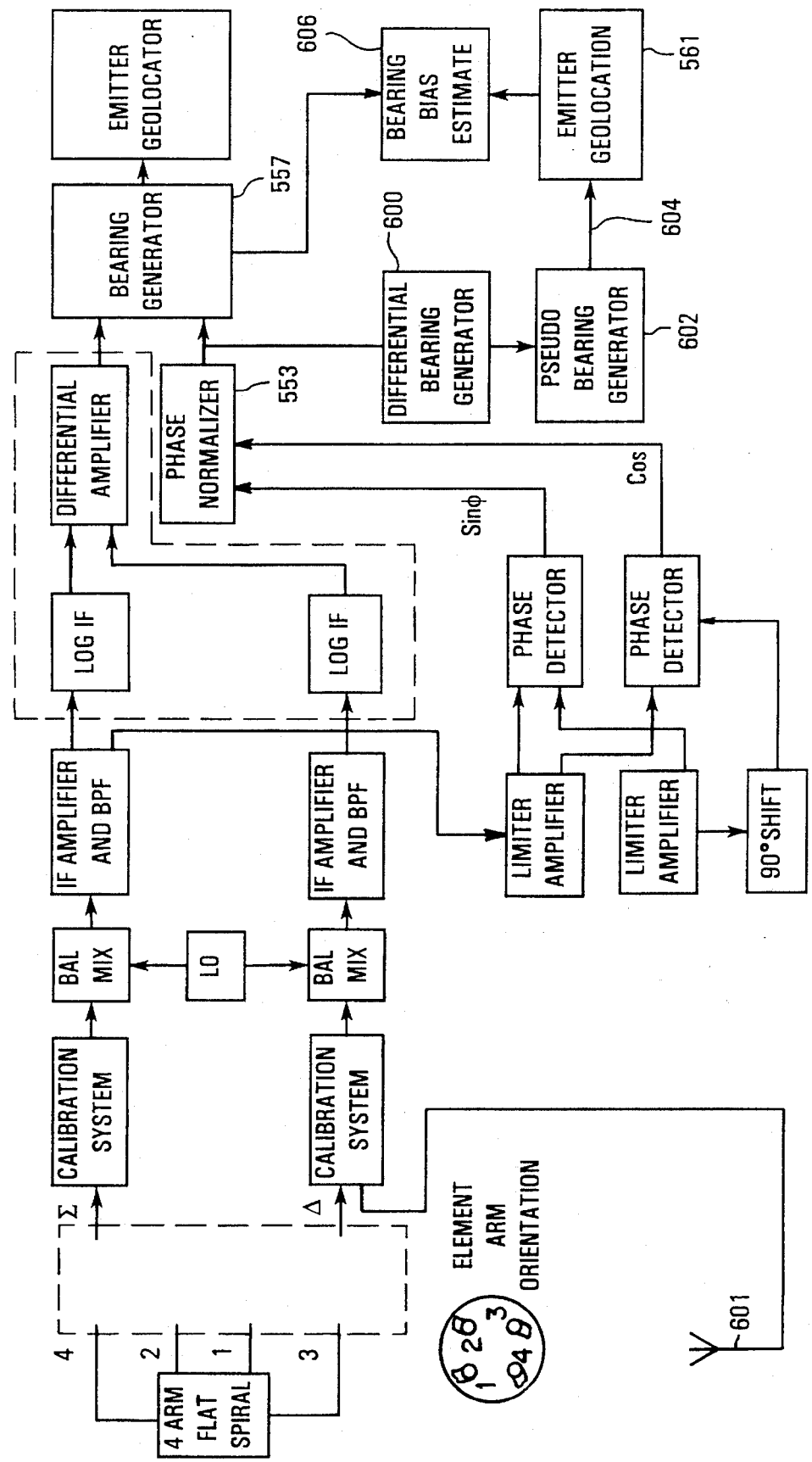
Figure 6C:
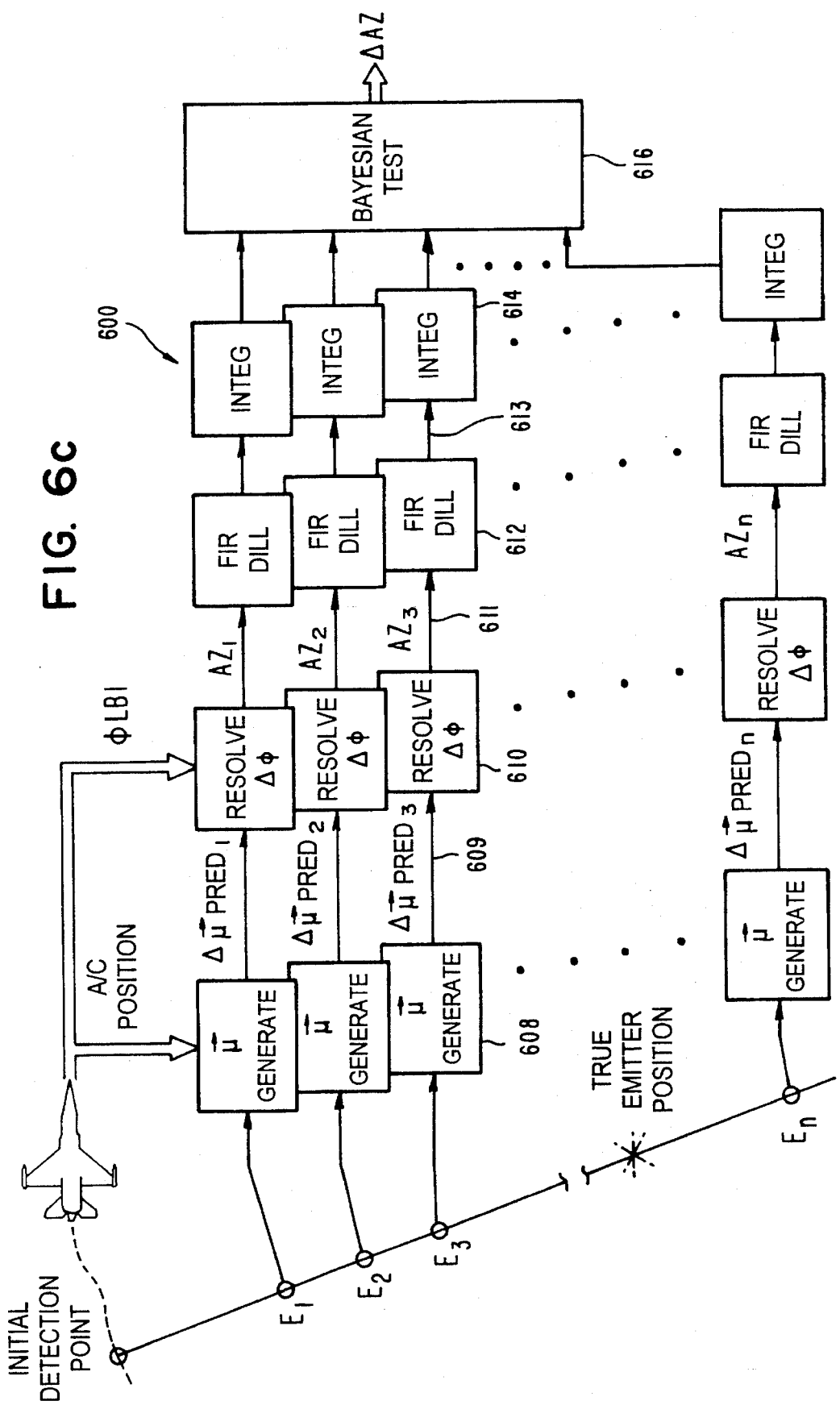
Figure 6D:
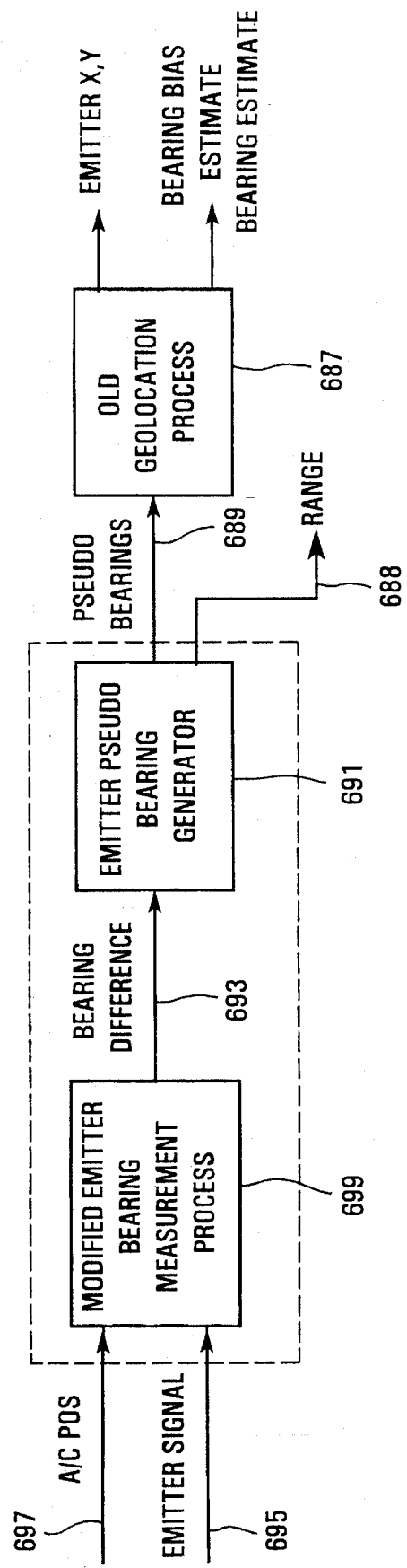
FIGS. 6d–6f show that modification to the system in FIG. 5 to implement the invention includes the addition of one antenna and phase processing software, using a second approach to generate bearing differences.
Figure 6E:
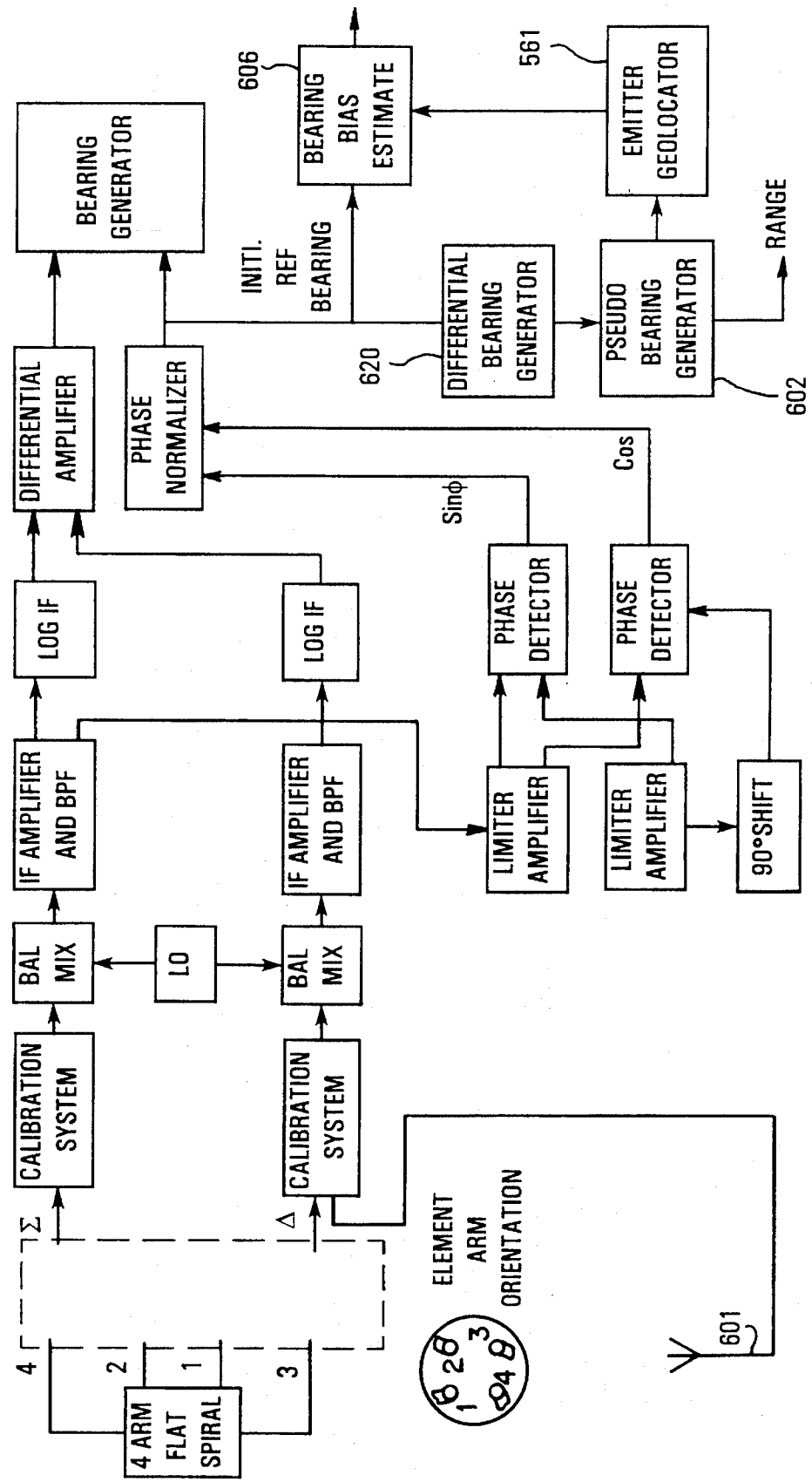
Figure 6F:
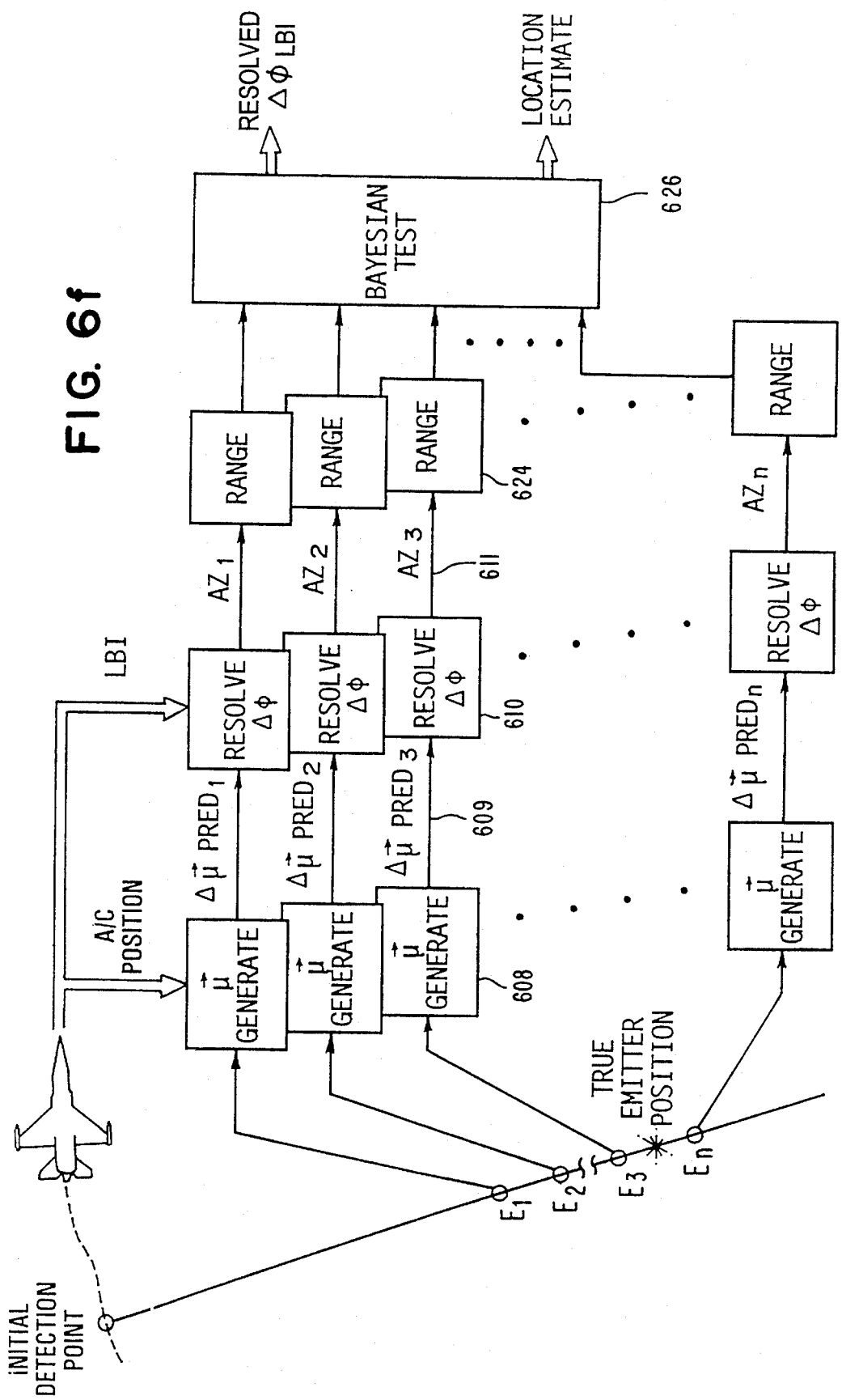

FIGS. 6b and 6e show how the two channel single antenna RW system in FIG. 5 is modified to generate precision emitter geolocation. Block diagrams of these embodiments are shown in FIGS. 6a and 6d, respectively. The modification involves adding one other antenna 601. While this antenna is shown connected to just one channel, alternatively, the second antenna can be connected to both channels as is the antenna shown in FIG. 5. For the modification of this system it is desirable to add a cavity-back four-arm spiral similar to the original antenna. Software additions are made to generate H*, but conventional emitter location software can be left unchanged. There are two ways to produce H* depending on the receiver tune strategy.

FIG. 6b shows the modification required when continuous updates are available, and FIG. 6e shows the modification when the emitter is revisited at possibly infrequent intervals, although rapidly enough to assure the systematic error is nearly constant between updates as discussed with respect to FIG. 4. In both cases, the additional antenna is utilized in conjunction with the already existing amplitude DF antenna to form a two element interferometer.

This modification is done to measure bearing rate of change. To measure this rate with the precision required generally necessitates a large spacing between the antennas, referred to as the interferometer baseline. This results in ambiguous AOA measurements. Furthermore, this baseline is not required to be calibrated in the current invention in order to reduce system cost and complexity. Hence a large phase bias error may be present.

FIGS. 6a–6c show one approach that can be used to generate the bearing differences required from the biased, ambiguous interferometer phase measurements.

In FIG. 6b, many of the elements of the wideband monopulse amplitude/phase DF subsystem shown in FIG. 5 are also used to form a precision geolocation subsystem. The precision geolocation subsystem does not include the logarithmic amplifier 527, 529 and differential amplifier 535 as shown in the dotted lines. However, the circuitry is retained for the wideband monopulse amplitude/phase DF subsystem.

In FIG. 6b, the output of differentiator/bearing generator 600, which is shown in more detail in FIG. 6c, is routed to pseudo bearing generator 602. Pseudo bearing generator 602 contains processing means for generating pseudo bearings, as previously discussed, on signal lines 604. The pseudo bearing information is then routed to emitter geolocator 561, which may be of conventional design. In addition, bearing information from bearing generator 557 is provided to bearing bias estimator 606. The output of emitter geolocator 561 is also provided to bearing bias estimator 606 to generate an unbiased current initial target bearing.

As shown in FIG. 6c, based on an initial detection point, a series of estimated emitter positions $e_1 \ldots e_n$ are postulated and applied to circuitry to arrive at an azimuth. This is accomplished by applying the aircraft position to unit vectors generated in processing blocks 608, to obtain predicted vectors on signal lines 609. This is applied along with the LBI phase to phase resolvers in phase blocks 610 to arrive at azimuths on signal lines 611. A finite impulse response (FIR) differentiator, which requires frequent emitter phase sample updates, is used and the results on signal lines 613 are applied to integrators 614. The output of each integrator is applied to a hypothesis tester such as Bayesian test block 616 to arrive at a change in azimuth.

The approach in FIGS. 6a–6c is based on the fact that measured interferometer AOA rate, unlike the measured angle, is not ambiguous. As shown in FIG. 6b, phase measurement involves generating the so-called I and Q functions, where $$I = \cos\left(\frac{2\pi d}{\lambda} \sin(AOA)\right) \qquad (11)$$

and $$Q = \sin\left(\frac{2\pi d}{\lambda} \sin(AOA)\right) \qquad (12)$$

with $\lambda$ being the emitter signal wavelength and d the interferometer baseline length, or spacing between the two antenna elements. I and Q are the in phase and quadrature components of a rotating vector of unit magnitude. The direction of rotation of this vector and the rotation rate are not ambiguous.

Thus when differentiation of the interferometer phase is used, there is no necessity to measure emitter AOA directly. The bearing differences required by equation 3 are generated from the differentiated phase measurements by integration. Both differentiation and integration can be performed in hardware or software by the use of well known techniques, such as those involving the utilization of finite impulse response (FIR) sampled data filters 612.

It is desirable in doing this differentiation to first remove the effect of sensor platform rotation. This can be done as follows. The roll, pitch and yaw rates in radian/second are the components of the platform's angular velocity vector $\vec{\omega}$:

$$\vec{\omega} = \begin{bmatrix} r \\ p \\ q \end{bmatrix} \qquad (13)$$

Then the change in interferometer baseline due to rotation is approximated by $$\frac{\vec{d_2} - \vec{d_1}}{\Delta t} = \vec{\omega} \times \vec{d_1} - \frac{1}{2}\left(\vec{d_1} - \vec{\omega}\frac{\vec{d_1} \cdot \vec{\omega}}{|\vec{\omega}|^2}\right)|\vec{\omega}|^2 \Delta t \qquad (14)$$

and so the change in phase $\Delta\phi_r$ due to rotation is known to be $$\Delta\phi_r = \frac{2\pi}{\lambda} \vec{u} \cdot (\vec{d_2} - \vec{d_1}) \qquad (15)$$

where u is $$\vec{u} = \cos(e)\cos(a)\vec{i} + \cos(e)\sin(a)\vec{j} + \sin(e)\vec{k}$$

where e = elevation angle, a = azimuth angle, and $\vec{i}, \vec{j}, \vec{k}$ correspond to x,y,z at the emitter.

and can be removed from the measured phase prior to differentiation so that all that remains is phase difference without undesired rotation effects.

There are other schemes in which unambiguous angle differences may be measured from the ambiguous interferometer. One such approach is Angle of Arrival/Long Baseline Interferometer (AOA/LBI) Emitter Ranging Method and Apparatus, described herein. Such schemes do not require regular, periodic emitter updates, nor is it required to perform phase preprocessing to remove platform rates. However, in these differencing schemes it may be preferable to estimate range before estimating geolocation. This is because the AOA/LBI approach couples range estimation with interferometer ambiguity resolution. An implementation of this approach is shown in FIGS. 6d–6f.

As previously discussed, in FIG. 6d, the range information is produced before estimating geolocation. This is shown in FIG. 6d as the range output on signal line 688 and as an emitter range output 622 from differential bearing generator 620 in FIG. 6e. It should be noted that the remaining elements of FIG. 6e correspond to FIG. 6b.

FIG. 6f shows an implementation which varies from that of FIG. 6c. In contrast to the implementation of FIG. 6c, FIG. 6f includes a range processor 624 which provides range information to Bayesian test block 626. As a result, the output of block 626 is a location estimate and a resolved change in phase of the LBI or long baseline interferometer. Range processor 624 can obtain good range information even with a bias error. However, the resolved LBI phase is proportional to the bearing difference. By appropriate scaling, the bearing difference can be obtained if infrequent emitter phase updates are provided.

The overall ranging scheme of the AOA/LBI approach used in a long baseline interferometer (LBI) apparatus shown in FIG. 6(f) substitutes DOA unit vectors $\vec{u}$, which are generated by a processor in block 608, for those previously generated in prior art systems by sequential SBI measurements. These software generated unit vectors, e.g., $\vec{u}_1$ and $\vec{u}_2$, predict the LBI phase change by:

$$\Delta\phi = \frac{2\pi}{\lambda} (\vec{u}_2 \cdot \vec{d}_{LBI_2} - \vec{u}_1 \cdot \vec{d}_{LBI_1}) \quad (16)$$

where the unit vectors are computed from the location hypothesis. Note that there is no scaling up of the errors with increasing baseline ratios in equation 10 as there is in conventional LBI/SBI approaches. The DOA generation algorithm is initialized by a single AOA measurement. The initial AOA measurement does not have to come from an SBI. It may come from a variety of sources, including amplitude DF measurements, an ambiguous SBI, or even an azimuth hypothesis test.

In contrast to conventional SBI/LBI systems, which require initial AOA measurement accuracy to within fractions of a degree, the initial AOA measurement of this AOA/LBI system typically need only have an accuracy of several degrees. This initial AOA error introduces a bias in the estimated target bearing, but does not otherwise significantly affect the accuracy of the DOA rate-of-change calculation, as long as inequality 15 (discussed further below) is satisfied.

As shown by inequality 21, the DOA rate-of-change accuracy is impacted by the emitter position assumed in the DOA generation processing block 608. This is why a number of emitter positions are assumed along the initial AOA. Assuming a plurality of emitter positions is equivalent to assuming different emitter elevations, and hence an elevation array is not required. Each of the DOA unit vectors generated in processing block 608 is biased by the same initial AOA error, but the rate of change is different for each different range assumed. As a result, the sequential LBI phase measurements must be differentially resolved using DOA unit vector pairs associated with each range partition. A new unit vector is computed using the resolved LBI phases and previous range estimate from the corresponding optimal estimator, i.e. range tracking filter 624.

The LBI-generated unit vectors each drive the optimal estimator (range filter) 624 which utilizes the bearing rate-of-change. The range filters associated with correctly resolved LBI measurements rapidly converge to a stable range estimate consistent with the range partition used in generating the input LBI. This single LBI range and associated elevation can then be used alone, after convergence, for further ambiguity resolution and location, or the multiplicity of estimates may continue to be used.

FIG. 6(f) shows the initialization approach of the invention. An initial measured angle of arrival is used to create N range partitions, shown as $E_1$ to $E_n$ in FIG. 6(f). The number of partitions created is restricted only by the requirement that at least one partition allow correct phase ambiguity resolution of the LBI. Many realizations of emitter tracking filters known in the art tend to initially generate range estimates that are consistently too long. The initial range partition may be used to compensate for this problem by making the partition logarithmic, that is establishing many partitions at shorter ranges and comparatively fewer at longer ranges. The n unit vector processing blocks 608 generate the unit vectors $\vec{u}_1$ to $\vec{u}_n$, one unit vector for each of n range partitions. Each unit vector processing block 608 outputs a predicted phase, $\phi_{pred}$, for its corresponding partition. The phase resolution processing blocks 610 resolve $\Delta\phi$, the differential LBI phase measured at two two different times or two different points in space. Phase resolution uses the predicted phase and the measured LBI phases $\Delta$LBI in FIG. 6(f). Such phase resolution appartus are known to those of ordinary skill.

The LBI-generated unit vectors each drive an optimal estimator (range filter) 624. Such filters are known to those of ordinary skill. These utilize the bearing change measured by the LBI, as well as initial range estimates from the center points of the initial range partitions. The range filters associated with correctly resolved LBI measurements rapidly converge to a stable range estimate, consistent with the range partition used in generating the input LBI. This LBI range and associated elevation computed from the range estimate and known aircraft altitude are then alone used for further ambiguity resolution and emitter range estimation refinement with each individual filter that was established by the original range partition.

The range processing blocks 624 utilize a Kalman filter in the preferred embodiment. Other appropriate filters can be utilized, as will be appreciated by those skilled in the art. The output from the filter will depend on the desired function performed and the allowed error tolerance. This will vary for each application and platform. For instance, typical filter outputs will be a slant range to the emitter. Other possible outputs include emitter latitude, longitude, azimuth and elevation.

Each filter output is provided to processing block 626 which utilizes known statistical techniques to simultaneously evaluate the quality of the multitude of range estimates and to assign quality measures, such as probability likelihood functions to each estimate. For example, a weighted average may be computed by a Bayesian hypothesis test, such as that described by D. T. Magill, "Optimal adaptive estimation of sampled stochastic process", IEEE Trans. Automatic Control, vol. AC-10, October, 1965. This average is the optimal emitter range estimate, and this range estimate is output for system utilization.

Yet another approach is to use the theoretical statistics of the optimally performing Kalman filter to chose the correct range estimate. The properties of these statistics are well known, and means for estimating them in real-time are described in R. K. Mehra, "On the Identification of Variances and Adaptive Kalman Filtering", IEEE Trans. Automatic Control, vol. AC-15, April 1970. Many of the tracking filters established by the initial range partition will exhibit near optimum statistics, making the choice of the correct range estimate straight forward.

The range estimate can further be utilized in a novel way to correct for emitter azimuth coning error, even when elevation is not measured. When an SBI is used to generate the initial AOA, an accurate DOA can be provided by using estimated location to provide an elevation estimate in order to generate true azimuth. If another AOA generator is used, accurate elevation and azimuth can still be generated when a terrain map is available, by applying techniques similar to those described in C. A. Baird, N. Collins, and M. Drew, "Terrain-Aided Navigation and Target Acquisition on the AFTI/F-16", 48th NATO/AGARD Guidance and Control Symposium, Lisbon, Portugal, May 1989.

L. H. Wegner, "On the Accuracy Analysis of Airborne Techniques for Passively Locating Electromagnetic Emitters", Report R-722-PR, Rand Corp, 1971, establishes the lower bound on the emitter range estimate error theoretically attainable. An approximation to the result in Wegner, specialized to ground-emitter passive location using an interferometer, is:

$$\left\langle \frac{\Delta r}{r} \right\rangle \geq \sqrt{\frac{12}{n}} \left( \frac{1}{\Delta a} \right) \left( \frac{\lambda}{2\pi} \right) \left( \frac{1}{d\cos(AOA_{AVG})} \right) \left( \frac{1}{\sqrt{SNR_d}} \right) \quad (17)$$

where, $\left\langle \frac{\Delta r}{r} \right\rangle$

= square root of the range error variance normalized by true range, n = number of DOA samples used in the location estimate, $\Delta a$ = change in bearing or DOA between initial and final bearing measurements, d = interferometer baseline length, SNR = receiver signal-to-noise ratio, and $\cos(AOA_{avg})$ = average interferometer off-boresite factor.

Thus, range estimate accuracy is a function of intercept geometry and emitter characteristics. In most tactical scenarios, no practical means are available for controlling or optimizing most of the parameters in equation 17. The number of samples, n, cannot be increased indefinitely by raising the sampling rate because of error correlation effects that arise at faster sampling rates. SNR improvement requires costly receiver calibration, and provides limited benefit for the complexity and time involved. Therefore, increasing the interferometer baseline length, d, is the only system parameter available that provides a generally robust way to speed convergence to emitter range. The instant invention includes an LBI approach that provides a means to increase the interferometer baseline length d without a significant increase in system weight and cost. The improved angular resolution obtained from the increase in baseline is limited only by NAV system errors.

Emitter direction finding (DF) requires generating the emitter direction-of-arrival (DOA) unit vector $\vec{u}$, which is a function of emitter azimuth and elevation relative to the observing platform. A single linear interferometer measures AOA, not DOA. That is, antenna elements lying on a linear interferometer baseline $\vec{d}$ measure the phase $\phi$ of an incoming signal with wavefront normal, given by the DOA unit vector $\vec{u}$ according to $$\phi = \frac{2\pi}{\lambda} \vec{d} \cdot \vec{u} = \frac{2\pi}{\lambda} d\cos(AOA) \quad (18)$$

Two interferometer measurements along non-collinear baselines are thus typically required to measure DOA, that is to determine true azimuth, a, and elevation, e, in the equation:

$$\vec{u} = \cos(e)\cos(a)\vec{i} + \cos(e)\sin(a)\vec{j} - \sin(e)\vec{k} \quad (19)$$

If only one interferometer baseline is used, an error in measuring true azimuth, known as the coning error, results. This error leads to a statistical relation between true azimuth measurement accuracy, $\sigma_{az}$, and the phase error, $\sigma_\phi$, approximated by:

$$\sigma_{az} = \frac{\lambda}{2\pi d} \frac{\sigma_\phi}{\cos(e)} \quad (20)$$

Thus, the coning error can be quite large at significant emitter elevations when only one interferometer baseline is used. However, measuring phase on multiple interferometer baselines is costly and complex because of the number of receiver channels typically needed. To reduce this complexity, the receiver channels measuring phase may be switched from one baseline to another. However, if the signal is not present during the entire measurement process, DF systems with multiple baselines may still not make enough independent AOA measurements to generate DOA.

The invention generates hypothetical AOA signal phases via the multitude of range filters. As shown in FIG. 6(f), each range filter 624 generates emitter DOA from emitter AOA measurements made with a single linear interferometer baseline. Therefore, the coning error is corrected without using multiple receiver channels, or channel switching, and without using multiple interferometer baselines. As a result, true azimuth is produced with much reduced system complexity, cost and weight.

An advantage the AOA/LBI system of the invention provides over prior art SBI/LBI approaches is removing the limitation on the LBI antenna's placement. An SBI is used with the LBI in the cases illustrated in FIGS. 13(a)-(c). With the conventional SBI/LBI, it is used at every LBI update, but with the AOA/LBI it is used only at the first LBI update.

Figure 13C:
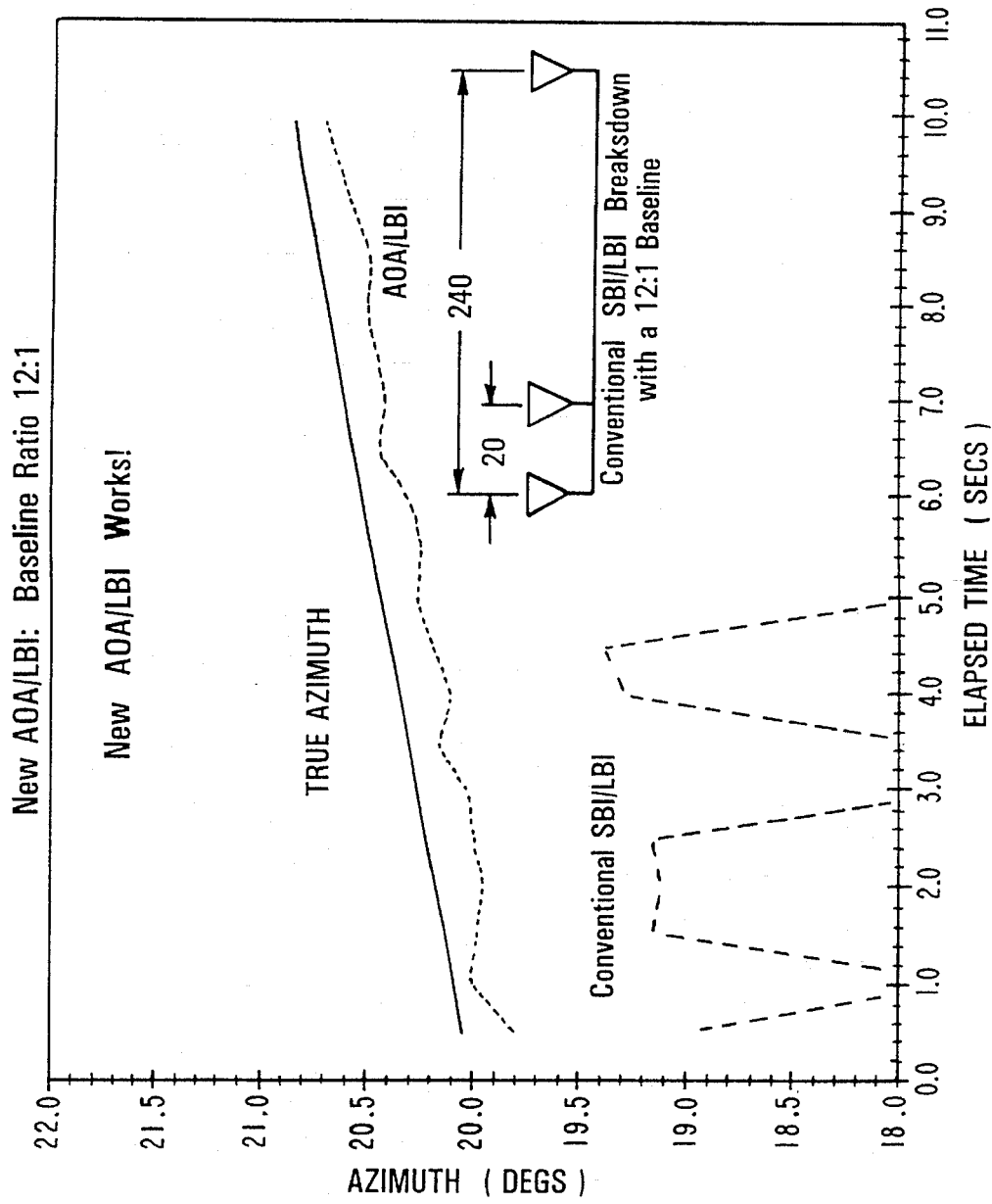

For the fixed scenario indicated in FIG. 13(a), the conventional SBI/LBI approach correctly resolves the LBI when the baseline ratio is 5:1. However, as illustrated in FIG. 13(b), when the ratio is 12:1, SBI/LBI does not work. A 12:1 ratio could be required, for example, if a radar warning (RW) pod is to be used for the LBI antenna mount on some tactical aircraft. In contrast to the limited capabilities of conventional SBI/LBI systems, the AOA/LBI system of the invention correctly resolves the longer baseline (12:1) as shown in FIG. 13(c).

Figure 13D:
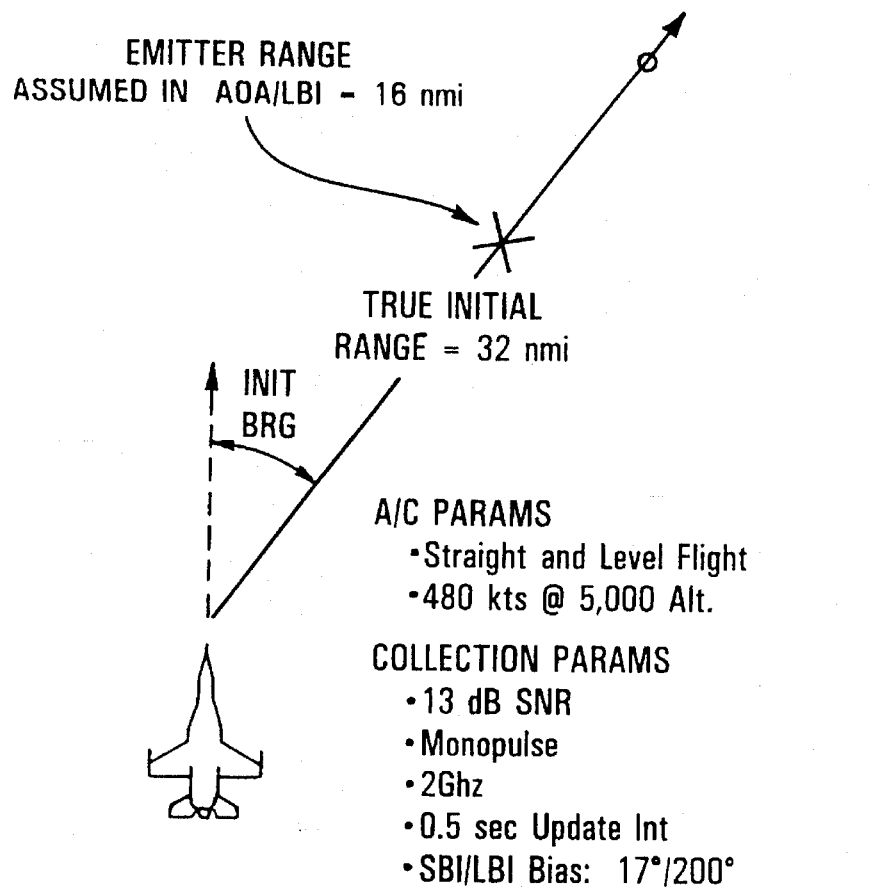
Figure 13D:
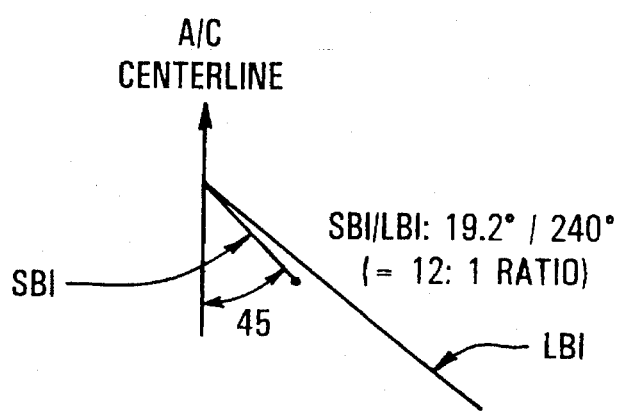

FIG. 13(d) illustrates the scenario in which only two range partitions where used, with the emitter hypothesized to be at 16 nmi, while it was actually at 32 nmi. Thus this scenario indicates the AOA/LBI system of the invention correctly resolves the LBI even with a 50% range error.

One fundamental concept that is exploited is insensitivity to initial AOA error, i.e., constant measurement bias, in the differential LBI ranging scheme. This occurs at two levels, ambiguity resolution and range estimation. First, the ambiguity resolution for the LBI unit vector generation that drives the location processing depends primarily on angle rates of change. Secondly, although the resulting DOA unit vector is biased, the range estimate that is driven by this biased input also primarily depends on rate of change.

A second fundamental concept is the insensitivity of LBI angular resolution accuracy to the accuracy of the predicted differential phase. Thus, a number of assumed ranges along the initial AOA extending from the aircraft to the radar horizon are used to predict the LBI phase change and this range partition can be fairly coarse and nonuniform. In fact any deviation $\Delta r$ from the true range $r_t$ will resolve the LBI integer ambiguity provided:

$$\frac{r_t}{1 - \frac{d}{\lambda} \Delta a \sin(a + \bar{a}) \left[ 1 - \bar{a}\cos(a) \frac{v_\perp \Delta t}{r_t} \right]} \geq \Delta r \geq$$

$$\frac{r_t}{1 + \frac{d}{\lambda} \Delta a \sin(a + \bar{a}) \left[ 1 - \bar{a}\cos(a) \frac{v_\perp \Delta t}{r_t} \right]}$$  (21)

where, $\bar{a}$=fixed DOA bias, a=true emitter bearing, $v_\perp$=velocity component perpendicular to emitter bearing, $\Delta t$=update time between measurements, $\Delta a$=bearing change at the emitter over the update time, and d=interferometer baseline length.

This allows many of the multiplicity of range estimates to converge to the correct range estimate.

A third fundamental concept exploited by the instant invention is the sensitivity of the LBI angular accuracy to correct ambiguity resolution. This means that performance of the range filters driven by the LBI DOA unit vectors resolved by different predicted range estimates can be used to determine which ambiguity resolution was correct. The preferred means for making this determination is an optimal estimator, such as a Kalman filter. Thus, when an initial range partition consistently generates the wrong ambiguity integer when resolving the LBI, the corresponding filter range output diverges from the true range. This behavior is detectable in real time using the statistical characteristics of the Kalman filter.

Both implementations shown in FIGS. 6a–6f eliminate the AOA measurement bias by employing bearing differences. This eliminates the systematic error because it is nearly constant over the bearing differencing period. These bias free bearing differences can then be used in two ways noted previously, i.e., using location circles or pseudo bearings. The bearing differences uniquely determine circles near which the emitter must lie, or equivalently the differences determine new or "pseudo" emitter bearings.

These new bearings are equivalent to bias-free bearing measurements made at the sensor platform with time lag relative to the true observer. The advantage to using pseudo bearing measurements in an existing system that is being modified, as that shown in FIG. 5 is that these new bearing measurements can be input to an existing bearings-only location algorithm with little software modification. Thus the geolocation software is unchanged, as indicated in FIGS. 6a–6f.

The output of the location processing block 561 is the geolocation of the emitter. This is typically in the form of cartesian position in the level frame, or latitude and longitude. The emitter geolocation estimate can be used to predict emitter AOA at the time the original AOA measurement was made by the amplitude DF system. This can be further used to estimate the bias in that AOA measurement, and do real-time system calibration to reduce the magnitude of the bias in doing future amplitude DF updates. Although not used in doing the geolocation, such DF refinements may be useful in performing other system functions, such as signal sorting.

Figure 7:
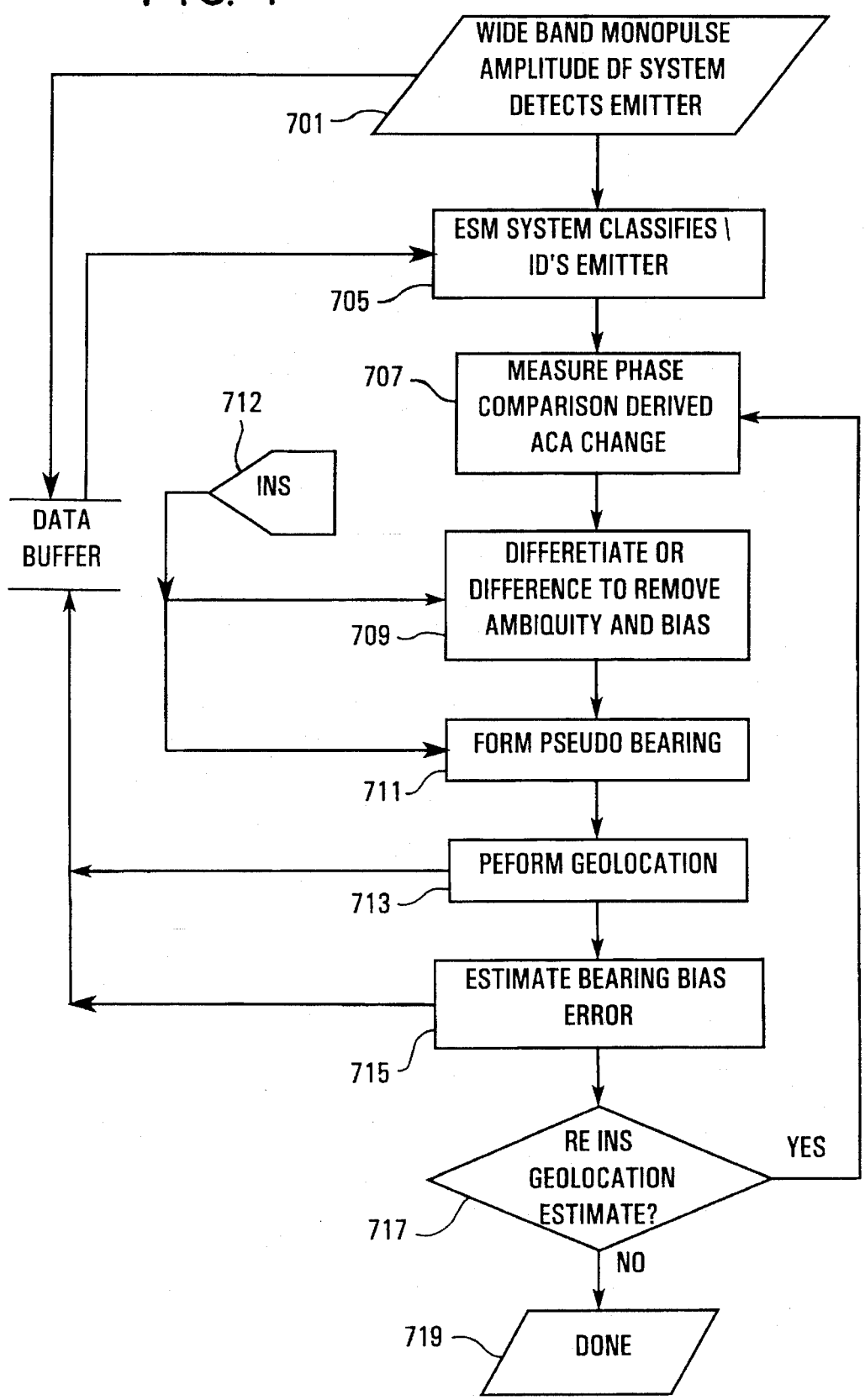
FIG. 7 is a flow chart explaining the interaction of the original system shown in FIG. 5 and the modified system shown in FIGS. 6a–6f.

The operation of the modified systems shown in FIGS. 6a–6f are shown in the flow chart in FIG. 7.

In step 701 a wideband monopulse amplitude direction finding system detects an emitter. The information is provided to a data buffer 703 while, at the same time, in step 705 an electronic surveillance measurement system classifies and identifies the emitter detected in step 701. The output from the ESM system is provided to step 707 which measure the phase comparison derived angle of arrival change. This is the output of phase normalizer on signal line 555 previously discussed. Using either of the systems shown in FIG. 6c or 6f, in step 709 removes the bias and the ambiguity. As shown in FIGS. 6a–6f, bearing differences are then provided to step 711 which forms the pseudo bearing information. Both steps 709 and 711 can rely on information provided by inertial navigation system 712. Following the determination of pseudo bearing information in step 711, geolocation can be performed in step 713. Optionally, the bearing bias error can be estimated in step 715. The geolocation information in step 713 and the estimated bearing bias error can also be supplied to data buffer 703. Next, in step 717, it is determined if it is necessary to refine the geolocation estimate. If so, control is transferred to step 707. If not, processing is completed as indicated in step 719.

Figure 8A:
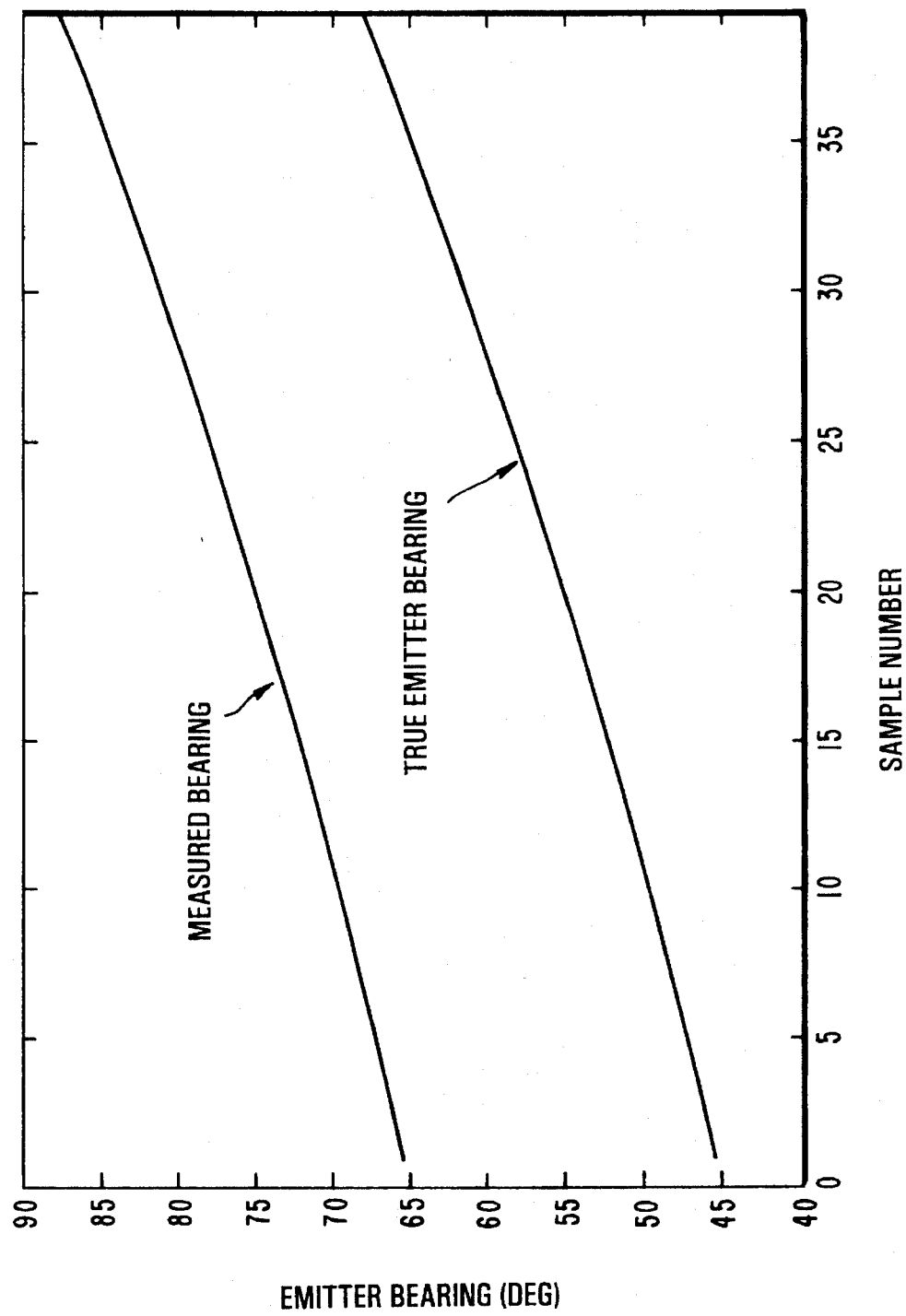
FIG. 8a shows true and measured bearing where measured bearing has significant bias error.
Figure 8B:
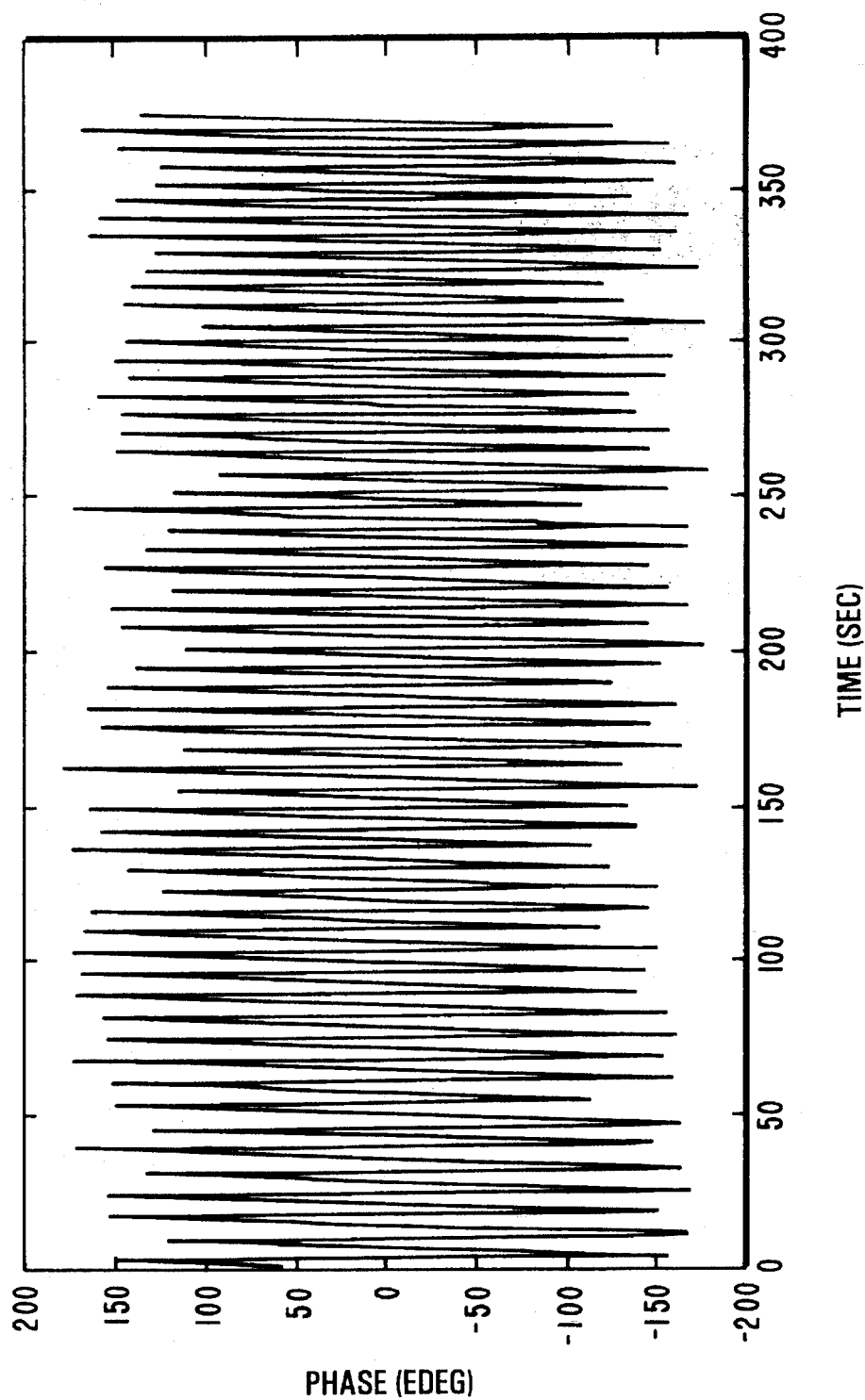
FIG. 8b shows the ambiguous phase measurement of the two element interferometer of FIG. 6b and FIG. 6e output from, e.g. the phase normalizer.
Figure 8D:
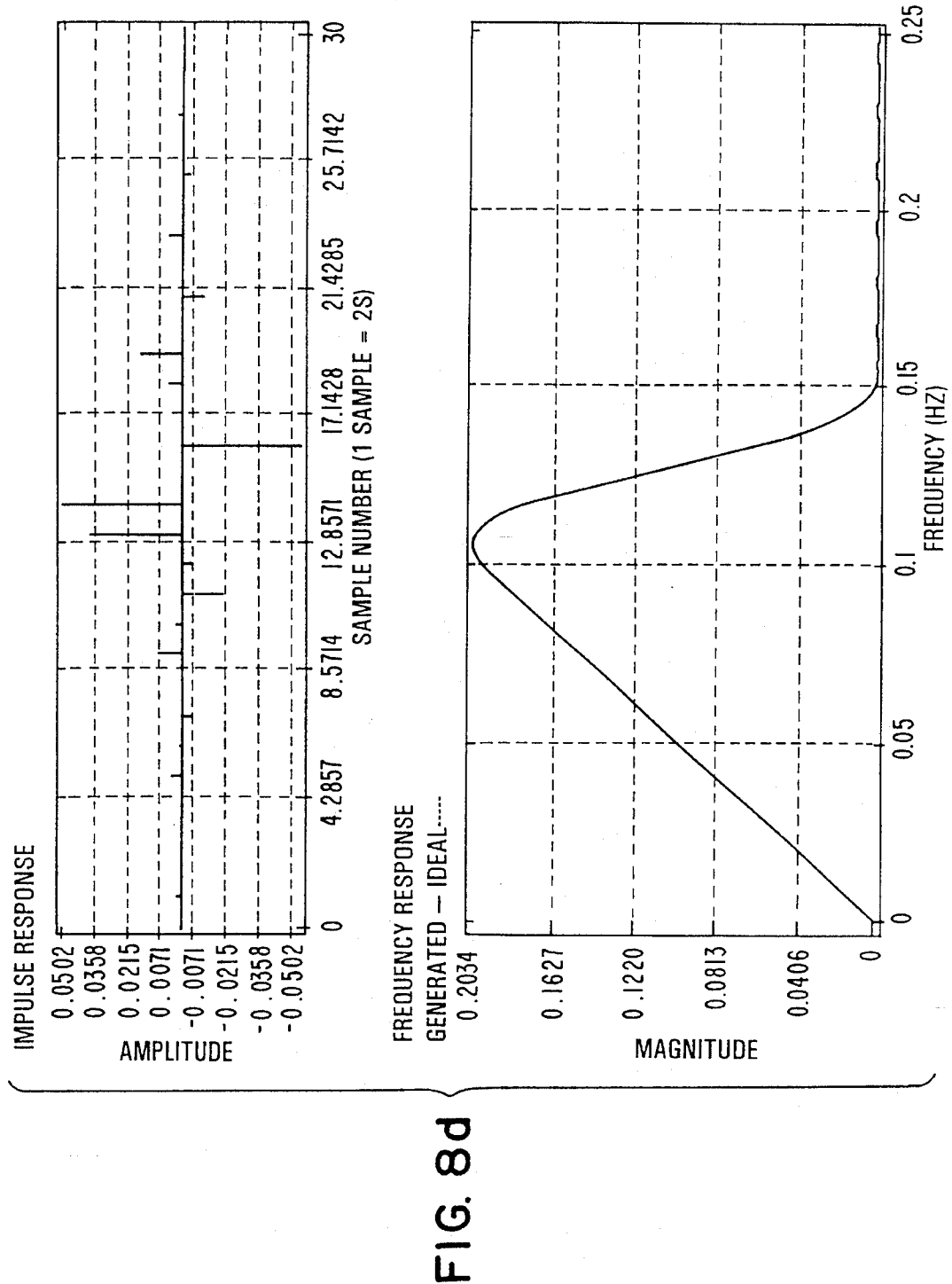
FIG. 8d shows a PARKS-McCLELLAN FIR Differentiator using to obtain bearing rate of change from I and Q.
Figure 8E:
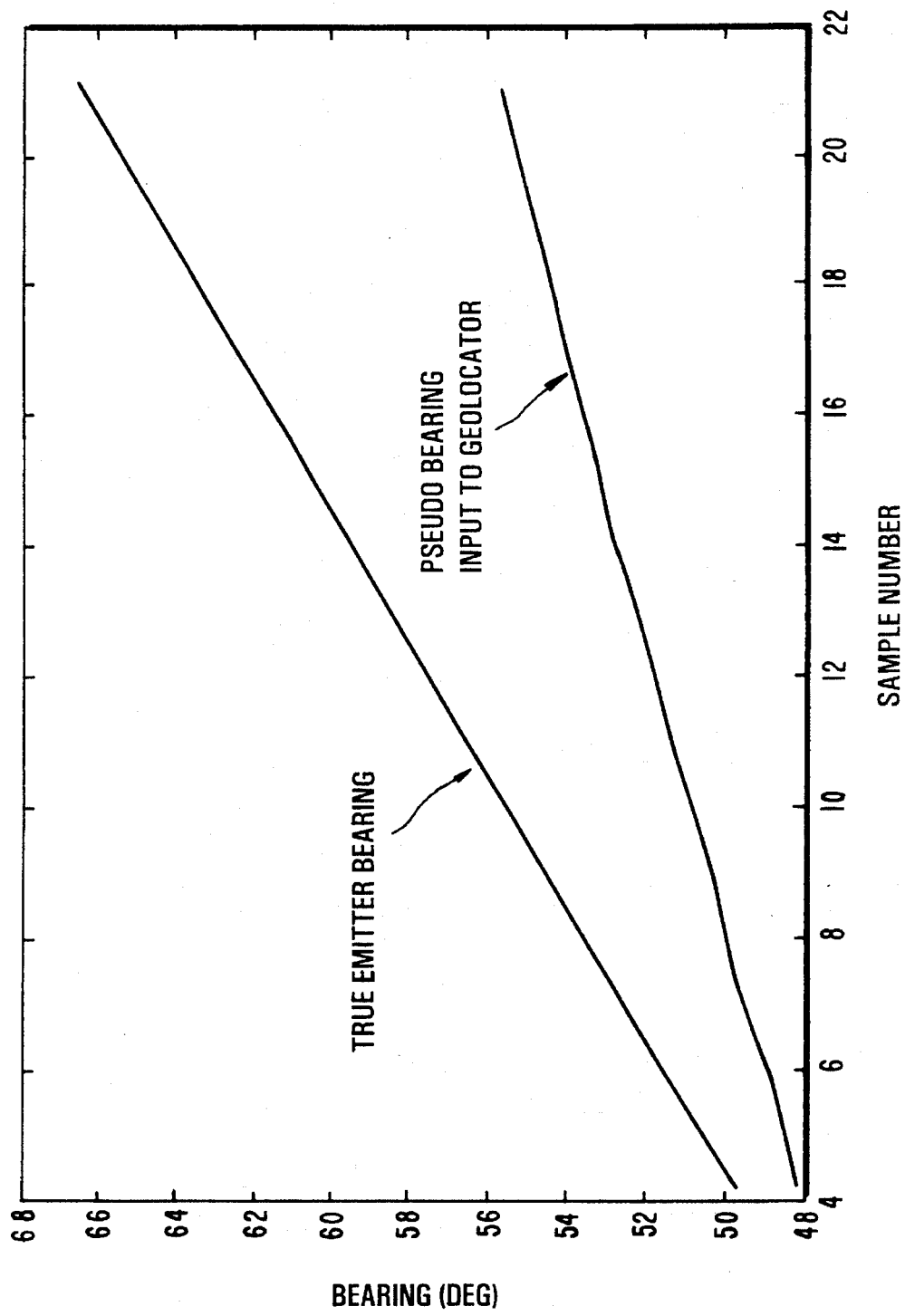
FIG. 8e shows the emitter true bearing and pseudo bearing.

Simulated performance results illustrate how noisy bearings with bias generate unbiased pseudo bearings which lead to both a final emitter geolocation estimate, and bearing measurement bias estimate. The scenario used is that described for the MGEKF performance, consisting of a single sensor platform moving at 480 kts, with an emitter 123 nm distant at a relative bearing of 45°. FIG. 8a shows the true and measured bearing. The measured bearing has a large systematic error of about 20°. This error is largely due to antenna pattern errors in doing the two channel phase/amplitude comparison utilizing the system shown in FIG. 5. It dominates all other errors during the emitter location period. FIG. 8b shows the ambiguous phase measured by the two element interferometer with a 231.6" baseline, and FIG. 8c shows the rate estimated from the I and Q functions by the FIR filter with impulse response shown in FIG. 8d. A Parks-McClellan FIR differentiator was used to obtain bearing rate of change from I and Q. The filter assumes an update rate of 0.5 seconds. The differentiated phase generates the pseudo bearing measurements, which are compared to the true bearing measurements in FIG. 8e.

Figure 8G:
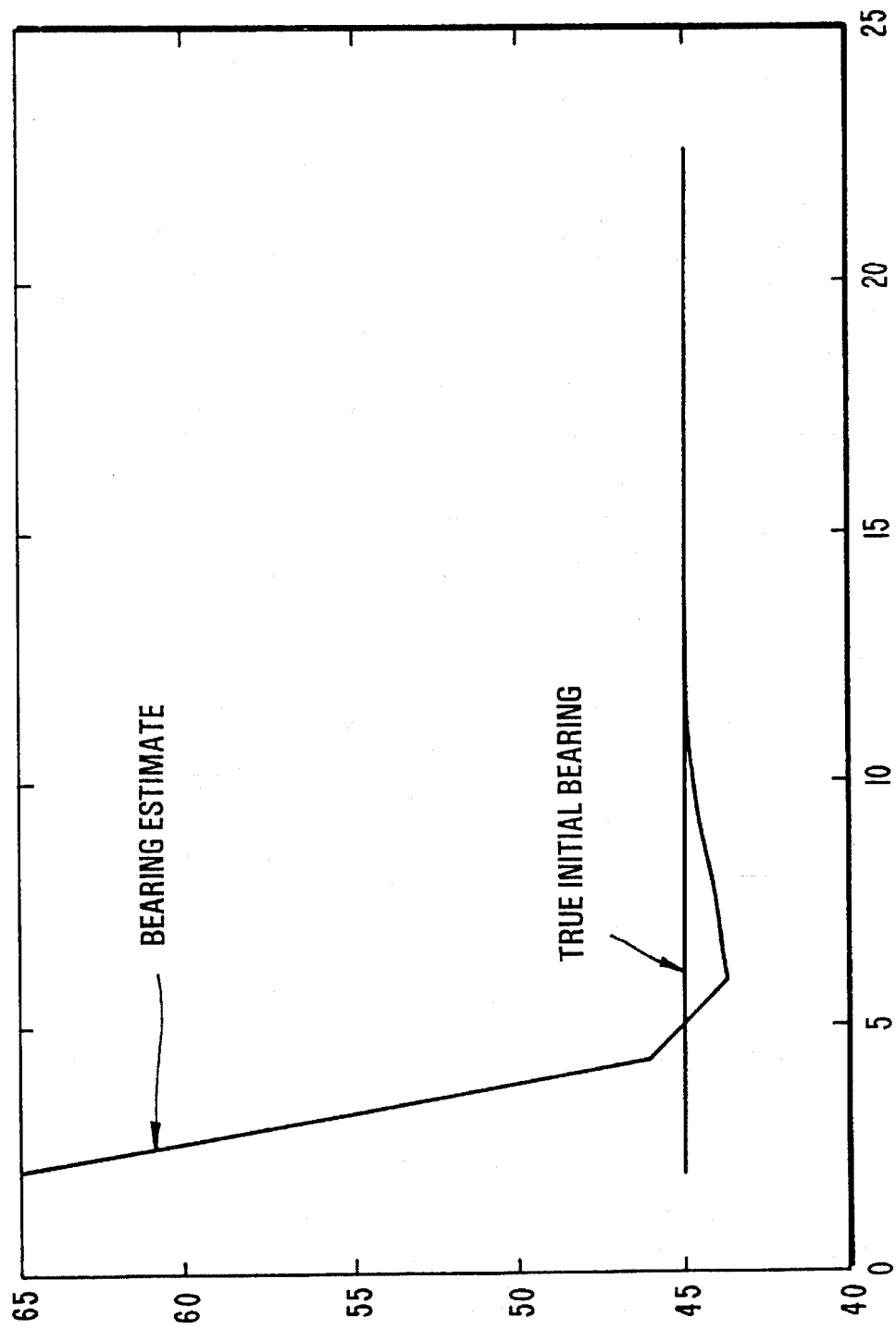
FIG. 8c shows the FIR differentiator output obtained from I and Q interferometer using FIR differentiator shown in FIG. 8d used in the embodiment of FIG. 6a–6c.
FIG. 8f shows range estimation performance of the invention even with a 20 degree bias in bearing measurement.

These pseudo bearing measurements are input to a geolocation estimator based on the model described by equations 1 and 2. This filter is structured to estimate the emitter range from the first bearing measurement, and its performance is shown in FIG. 8f. The output from the location filter is used to remove, or equivalently identify the bias in the initial bearing estimate, as shown in FIG. 8g. The results shown in FIGS. 8f and 8g should be contrasted with those of FIG. 2. If the updates are infrequent or irregular the bearing differences can be formed utilizing the AOA/LBI technique mentioned before. As FIG. 8h indicates, range will be estimated during the interferometer ambiguity resolution process. However, as shown in FIG. 1, the range estimate can be inaccurate, and is not used elsewhere in this technique for doing geolocation.

Figure 9:
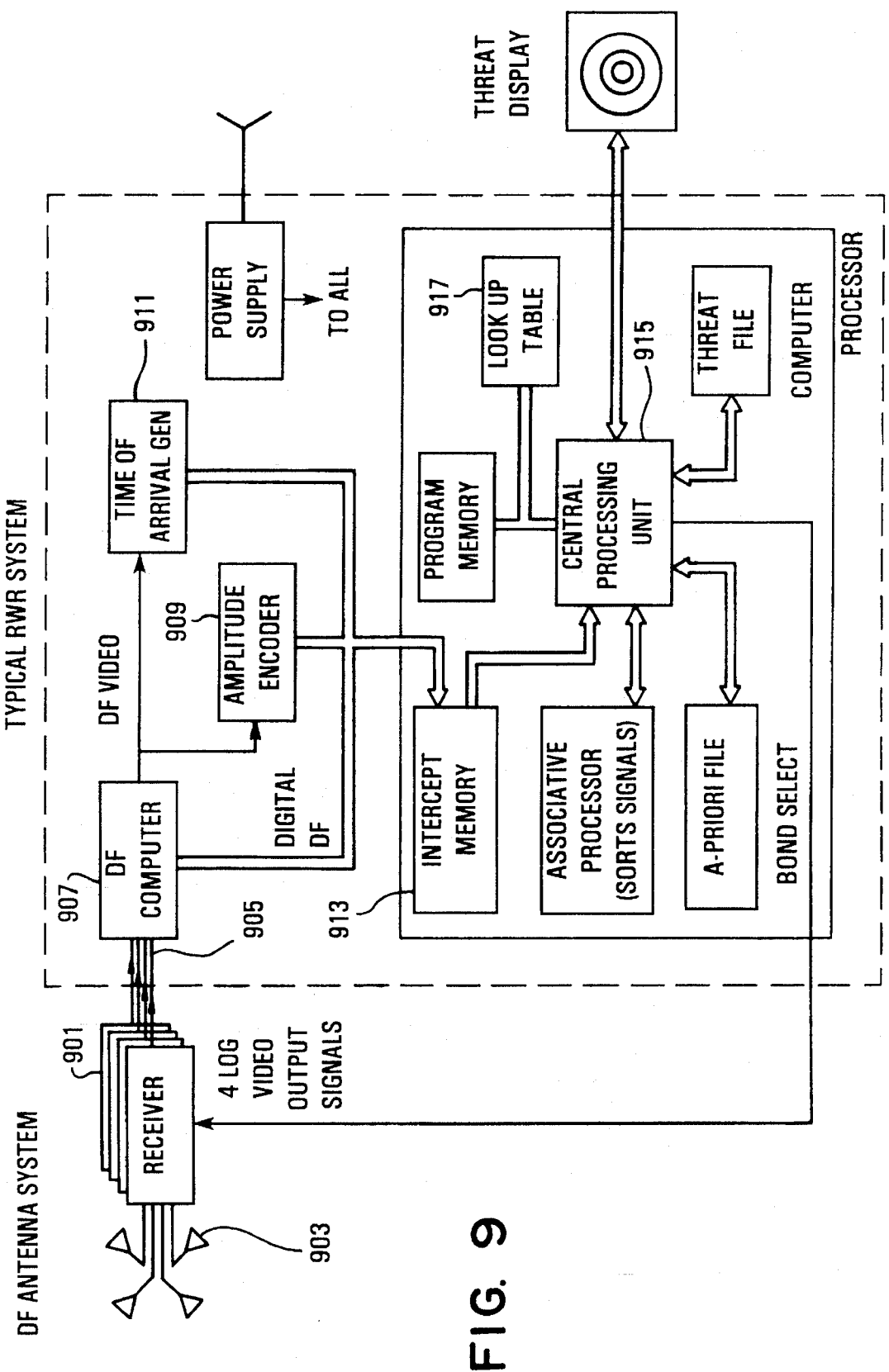
FIG. 9 shows a typical RWR system.

FIG. 9 shows a typical RWR (Radar Warning Receiver) system from which another embodiment of the invention may be derived. This illustration is taken from *Microwave Passive Direction Finding* by S. F. Lipsky, John Wiley and Sons, New York, 1987, but is representative of such systems as the ALR-69 system, manufactured by the Advanced Technology Division of Litton Industries. The amplitude response of each antenna to an emitter location is unique, thus permitting AOA by the amplitude monopulse technique. The four receivers of FIG. 9 convert the RF outputs of the antennas 903 to four log video outputs on signal line 905. Since the desired RF range is 2–18 GHz, band selection is utilized to reduce the pulse density of the environment resulting in a receiver instantaneous bandwidth of 4 GHz. Thus, the four log video outputs are proportional to the quadrant antenna responses and are utilized by the DF computer 907 to obtain digital AOA. The DF video is encoded to produce digital amplitude (PA) in amplitude encoder 909 and time of arrival (TOA) in TOA generator 911. The digital DF, PA and TOA is stored in the intercept Memory 913 for further use by the central processing unit (CPU).

Thus each pulse is represented by a pulse descriptor word typically 80 to 100 bits. This word contains frequency band, pulse amplitude, pulse width, angle or arrival, time of arrival. From this information the CPU 915 is able to separate the pulse data into groups (deinterleaving) representing separate emitters. The primary deinterleaving parameter is AOA because the primary function of a radar warning receiver (RWR) is to warn the crew of the host vehicle of an immediate threat with enough information so that self protection can be performed. To accomplish this function, the RWR intercepts main-lobe radiations of enemy radars, stores each intercepted radar signal (radar pulses) with its measured parameters (e.g. frequency, pulse width amplitude, angle of arrival (AOA), and time of arrival (TOA), sorts the pulses into groups associated with each radar emitter, and then matches the parameters of each group against a stored library which identifies the types of radars involved. Identification of the radar allows the identity of the associated weapon, which, in turn determines the priority of the threat. A look up table 917 provides DF correction as a function of frequency band and as azimuth resulting in more accurate AOA measurements. Thus antenna beam width variation that effect antenna amplitude patterns are calibrated out. When the intercept data match the threat file data an alphanumeric symbol in generated for the identified emitter. The AOA and PA data are then used to display this threat symbol at the emitter's location on the display.

Figure 10:
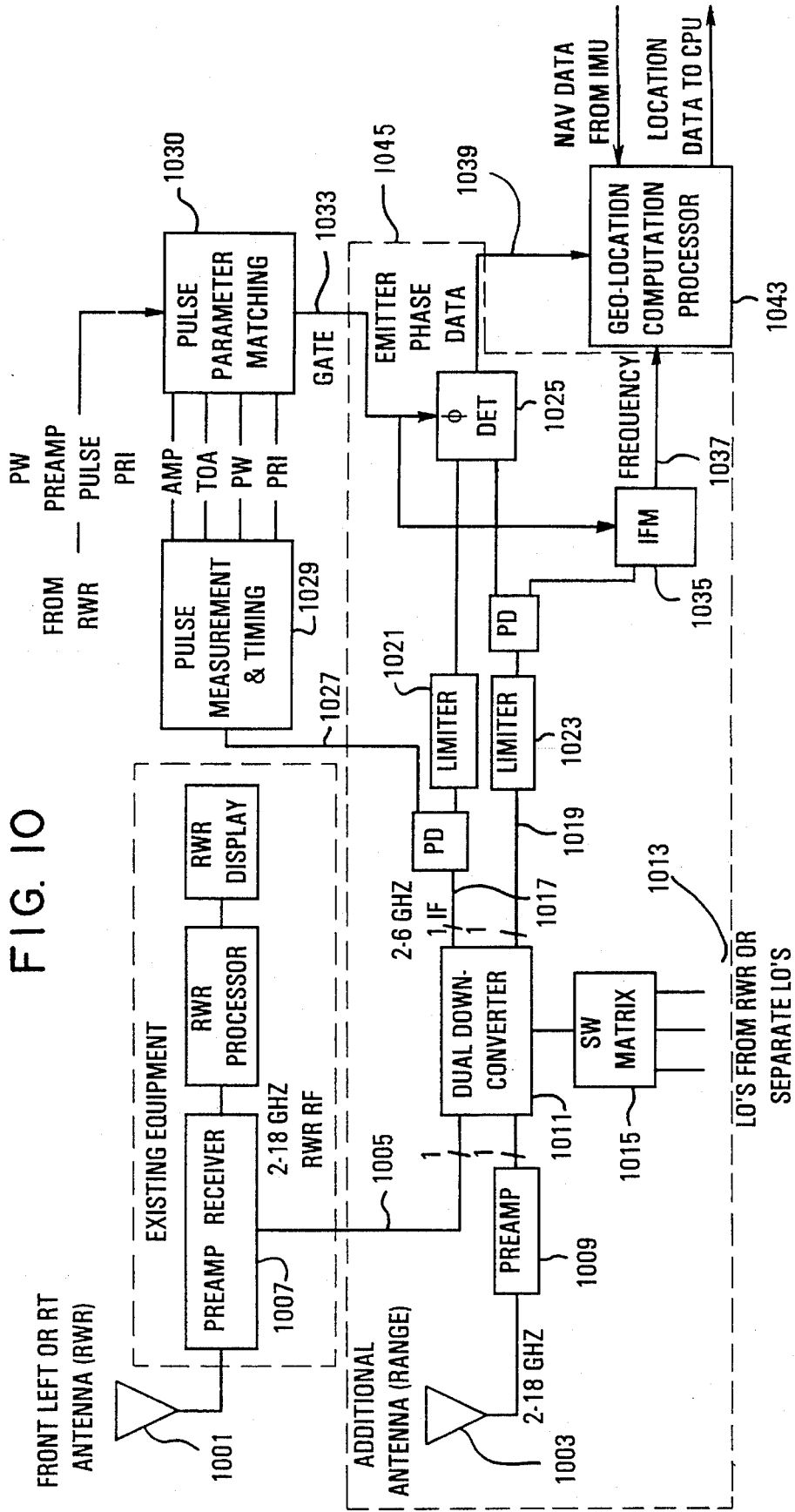
FIG. 10 shows modifications of an RWR system for independent RWR/Location measurements.
Figure 11:
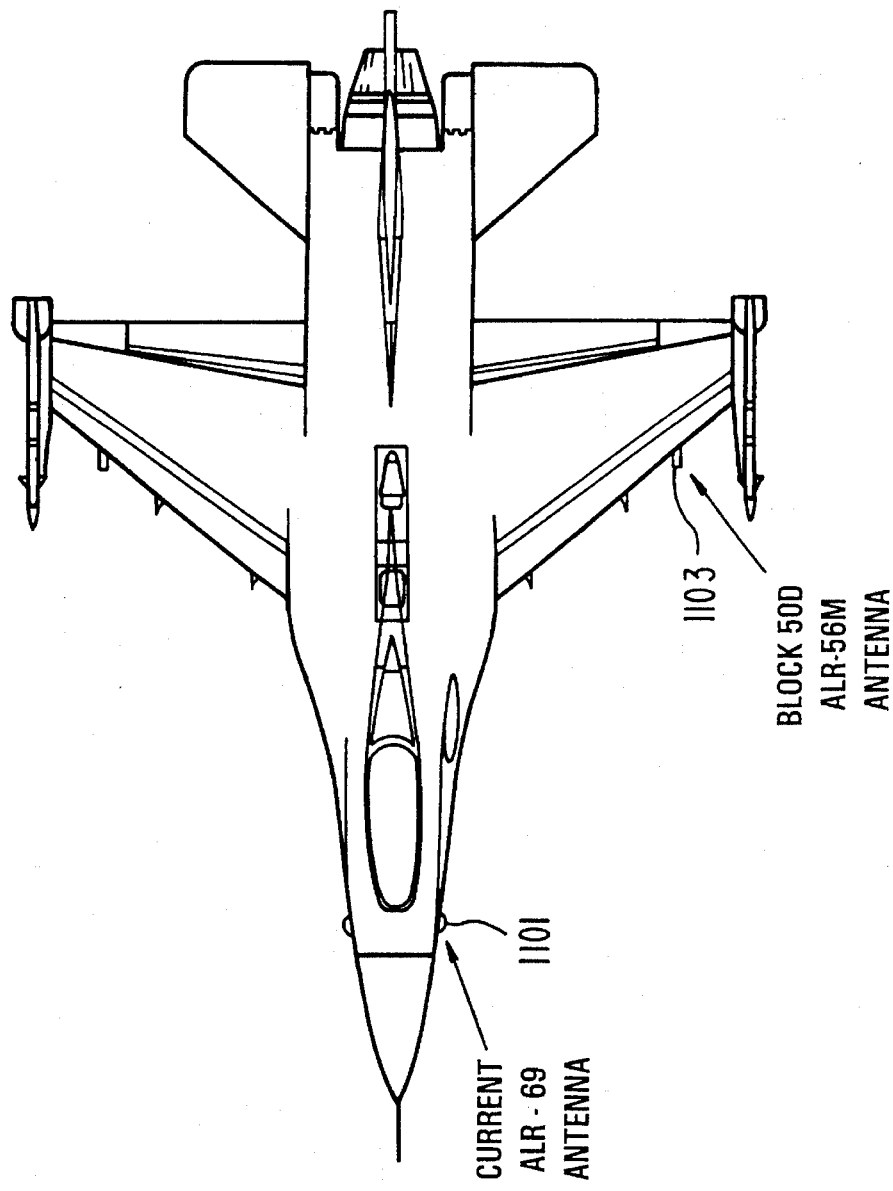
FIG. 11 shows example RWR antenna locations on a military aircraft.

FIG. 10 is a block diagram of the receiver system necessary to perform ranging in conjunction with an existing RWR receiver. The RWR receiver can be one such as that used in the ALR-69 system, manufactured by the Advanced Technology Division of Litton Industries. The antennas shown in that figure, 1001 and 1003, may be those already existing on the aircraft, as shown in FIG. 11, as antennas 1101 and 1103.

The only modification to the RWR is that a 2–18 GHz RF takeoff, 1005, from one Antenna/Pre-Amp 1007 of the RWR. However, since the RWR and geolocation are independent, additional hardware shown below dotted line 1045 is required to achieve such independence. The range measurement requires an additional antenna/preamp 1009 near one of the forward looking antennas of the RWR. This produces, as shown in FIG. 10, two 2–18 GHz RF inputs to the dual down converter 1011.

This converter is essentially a superheterodyne receiver that breaks the 2–18 GHz band into four bands each with an instantaneous bandwidth of 4 GHz and then converts the top 3 bands to a 2–6 GHz IF. The converter is identical to the four quadrant converters used by the RWR. It is seen from FIG. 10 that the band selection is accomplished by applying the desired LO (local oscillator) frequency signal 1013, to the dual converter 1011 through SW matrix 1015, thus making the range measurement independent of the RWR. The LO's 1013 can be derived from the RWR or they can be separate fixed frequency LO's which are locked to frequency reference. The two IF outputs from the dual down converter on signal lines 1017 and 1019 are inputs to two limiters 1021 and 1023 and a phase detector 1025 which produce a phase difference measurement between the two IF's. These components (LIM/DET) are standard catalog items. As shown in FIG. 10 a 2–6 GHz IF output from the down converter is applied on signal line 1027 to the Pulse Measurement circuits 1029 which threshold on pulse amplitude and provide measurement of pulse amplitude, TOA (time-of-arrival), PW (pulse width) and PRI (pulse repetition interval). These measurements are used by the pulse parameter matching circuits 1031 to generate a gate 1033 which selects the desired emitter pulses from the environment at the correct frequency band. This way the RWR selects the emitter for which range measurements are to be made.

To identify the emitter that is to be located the RWR must send as a minimum the following data, Pulse Width Pulse Amplitude and PRI.

It is realized that this is not real time data since the location equipment is tuned separately from the RWR; i.e., external gates are not possible. Thus the parameter match and measurement hardware is required in this case.

A 2–6 GHz limited IF is also applied to an IFM (instantaneous frequency measurement) 1035 which performs frequency measurements on each pulse. Both the IFM 1035 and the Phase detector 1025 utilize the gate 1033 to output only measurements from the desired emitter. The frequency data supplied on signal line 1037 and phase data supplied on signal line 1039 along with the NAV data from the IMU (Inertial Measurement Unit) on signal line 1041 are the necessary inputs to the Geolocation computation processor 1043. Processor 1043 can utilize the circle loci approach desribed in association with FIGS. 3c and 3d to determine emitter geolocation. Alternative approaches described herein can also be utilized.

Figure 12:
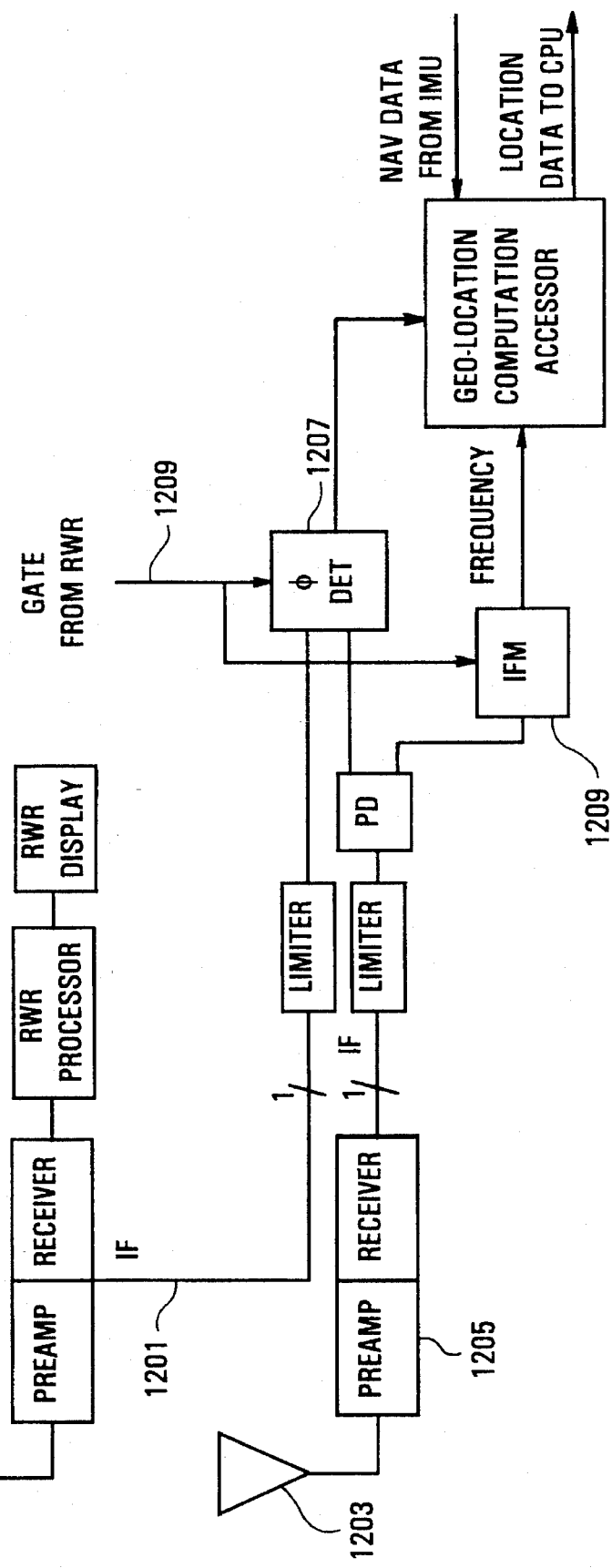
FIG. 12 shows modifications of an existing RWR system for non-independent RWR/Location measurements.

To simplify the range measurement receiver shown in FIG. 10 measurements of range can be made non independent of the RWR band selection as shown in FIG. 12. This method requires the RWR to send gates for the desired emitter range measurement and also requires that the band dwell of RWR be long enough (3–5 pulses per emitter) to make the range measurement. As shown in FIG. 3 the RWR supplies a 2–6 GHz IF on signal line 1201 from the left or right front quadrant thus the range measurement can be made only in the band which the RWR selects. An additional antenna 1203 and preamp/down converter 1205 provides the second IF so that the phase and frequency measurements can be made. A gate 1209 supplied by the RWR is used by the phase detector 1207 and the IFM 1209 to supply data on only the desired emitter to the Geolocation computer.

Gate 1209 defines the time when the pulse of the desired emitter is present. The RWR determines which emitter geolocation is desired. The location calculation requires on pulses. Thus the RWR dwell time is only minimally if at all effected by this slave type of operation. It is possible to also locate two or more emitters in a band at the same time.

It is seen that this block diagram simplifies the hardware required to perform range measurements at the possible extent of slightly increased band dwells.

The above results indicate this technique represents a method of combining the benefits of bearing-rate ranging, the benefits of phase comparison, and the benefits of amplitude RW DF to produce accurate geolocation using relatively simple systems. The modification required to amplitude DF systems to do this is low cost, low weight, and requires basically only adding one antenna element.

It will be known to those of ordinary skill that the processing in the emitter bearing measurement process 301, emitter loci generator 339, geolocation processing blocks 303, 345, 561 and 1045, psuedo bearing generator 369 and 691 and other associated processing in this invention can be realized in individual processors or in a single processor using centralized or distributed processing as may be appropriate to a given application.

While specific embodiments of the invention have been described and illustrated, it will be clear that variations in the details of the embodiments specifically illustrated and described may be made without departing from the true spirit and scope of the invention as defined in the appended claims.

What is claimed is:

1. An apparatus for separating slowly varying systematic error in emitter bearing measurements from rapidly varying random error comprising:

means for varying the bearing measurement sample times to convert the slowly varying systematic error to an approximately fixed bias between individual updates;

means for removing the approximately fixed bias by differencing or differentiating the bearing measurements;

means for generating a new bearing measurement without bias; and means for processing the new bearing measurement to obtain geolocation.

2. A geolocation apparatus using ambiguous phase measurements to locate an emitter without requiring DOA measurements having the same relative bearings, comprising:

an unresolved, uncalibrated interferometer having at least first and second antennas for generating first and second emitter detection signals containing ambiguous phase information;

phase comparison circuitry for comparing said phase information from said first and second detection signals and thereby producing phase difference signals;

means for converting said phase differing signals to signals representing unambiguous emitter angular bearing differences, comprising:

a. means for postulating at least one estimated emitter position to create a pseudo-bearing, b. means for processing aircraft position information with unit vectors to generate signals representing a predicted vector, c. a phase resolver receiving said signals representing predicted vectors and phase information to produce an azimuth signal, d. a finite impulse response differentiator receiving said azimuth signal and outputting a differentiated signal, e. an integrator receiving said differentiated signal and having an integration output and f. means receiving said integration output for hypothesis testing, said means producing a signal representing a change in azimuth; and means for generating emitter geolocation signals from said emitter angular bearing differences.

3. The apparatus defined in claim 2 wherein said phase comparison circuity comprises circuits for determining said phase difference from said first and second detection signals on inphase and quadrature channels.

4. A geolocation apparatus using ambiguous phase measurements to locate an emitter without requiring DOA measurements having the same relative bearing, comprising:

an unresolved, uncalibrated interferometer having at least first and second antennas for generating first and second emitter detection signals containing ambiguous phase information;

phase comparison circuitry for comparing said phase information from said first and second detection signals and thereby producing phase difference signals;

means for converting said phase difference signals to signals representing unambiguous emitter angular bearing differences comprising:

a. means for postulating at least one estimated emitter position to create a pseudo-bearing, b. means for processing aircraft position information with unit vectors to generate a signal representing a predicted vector, c. a phase resolver receiving said signals representing predicted vectors and phase information to produce an azimuth signal, d. an AOA/LBI range processor having range filters and processing means to rapidly converge to a stable range estimate output signal, e. means receiving said range estimate output signal for hypothesis and f. means receiving said integration output for hypothesis testing said means producing a signal representing a change in azimuth and means for generating emitter geolocation signals from said emitter angular bearing differences.

5. The apparatus recited in claim 4 wherein said phase comparison circuitry comprises circuits for determining said phase difference from said first and second detection signals on inphase and quadrature channels.

\* \* \* \* \*